(12) United States Patent
Tsukada et al.

(10) Patent No.: US 10,336,095 B2
(45) Date of Patent: Jul. 2, 2019

(54) PRINTING APPARATUS AND CONTROL METHOD OF PRINTING APPARATUS

(71) Applicant: SEIKO EPSON CORPORATION, Tokyo (JP)

(72) Inventors: Kazunari Tsukada, Shiojiri (JP); Masakazu Tokunaga, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/988,306

(22) Filed: May 24, 2018

(65) Prior Publication Data

US 2018/0339522 A1   Nov. 29, 2018

(30) Foreign Application Priority Data

May 25, 2017   (JP) .................................. 2017-103374

(51) Int. Cl.
| | |
|---|---|
| *B41J 2/21* | (2006.01) |
| *B41J 25/00* | (2006.01) |
| *B41J 29/393* | (2006.01) |
| *G06K 15/02* | (2006.01) |
| *H04N 1/60* | (2006.01) |
| *H04N 1/50* | (2006.01) |

(52) U.S. Cl.
CPC ........... *B41J 2/2146* (2013.01); *B41J 25/001* (2013.01); *B41J 29/393* (2013.01); *G06K 15/027* (2013.01); *H04N 1/506* (2013.01); *H04N 1/6033* (2013.01)

(58) Field of Classification Search
CPC combination set(s) only.
See application file for complete search history.

(56) References Cited

U.S. PATENT DOCUMENTS

| | | | |
|---|---|---|---|
| 6,975,466 B2* | 12/2005 | Umeyama ............ | B41J 2/14024 347/20 |
| 2004/0090534 A1* | 5/2004 | Nakami ............... | H04N 1/2112 348/220.1 |
| 2006/0262361 A1 | 11/2006 | Nakano et al. | |
| 2010/0157342 A1 | 6/2010 | Nakano et al. | |

(Continued)

FOREIGN PATENT DOCUMENTS

| | | |
|---|---|---|
| JP | 06-238969 A | 8/1994 |
| JP | 2006-305956 A | 11/2006 |

(Continued)

*Primary Examiner* — Thinh H Nguyen
(74) *Attorney, Agent, or Firm* — Foley & Lardner LLP

(57) ABSTRACT

There is provided a printing apparatus including: a transport mechanism; an ink jet head; a camera; a light source that irradiates a capturing area of the camera with light at a predetermined angle with respect to a print surface of the print medium; a carriage that includes the ink jet head, the camera, and the light source; and a controller (processor) that acquires reflectance characteristic data of irradiation light from the light source based on a captured image obtained by capturing an image of a printed test pattern by the camera, determines a specific initial-and-final-image-data range or a specific acquisition range in which the reflectance is within a specific reflectance range based on the acquired reflectance characteristic data, and acquires captured image data corresponding to the specific initial-and-final-image-data range or the specific acquisition range.

10 Claims, 20 Drawing Sheets

(56) References Cited

U.S. PATENT DOCUMENTS

| | | | |
|---|---|---|---|
| 2011/0063384 A1* | 3/2011 | Uchida | B41J 2/17513 347/86 |
| 2012/0050376 A1 | 3/2012 | Nagoshi et al. | |
| 2012/0069411 A1* | 3/2012 | Satoh | H04N 1/6044 358/504 |
| 2013/0027721 A1* | 1/2013 | Kobayashi | H04N 1/6033 358/1.9 |
| 2013/0135484 A1* | 5/2013 | Satoh | H04N 1/00278 348/207.2 |
| 2013/0208289 A1* | 8/2013 | Satoh | G01J 3/462 358/1.9 |
| 2013/0229671 A1* | 9/2013 | Yokozawa | H04N 1/6033 358/1.9 |
| 2013/0235115 A1 | 9/2013 | Nagoshi et al. | |
| 2013/0242319 A1* | 9/2013 | Suzuki | G06K 15/02 358/1.9 |
| 2013/0242320 A1* | 9/2013 | Suzuki | H04N 1/6033 358/1.9 |
| 2013/0242321 A1* | 9/2013 | Okada | H04N 1/6033 358/1.9 |
| 2013/0242361 A1* | 9/2013 | Matsumoto | H04N 1/6044 358/504 |
| 2013/0258368 A1* | 10/2013 | Shigemoto | H04N 1/00082 358/1.9 |
| 2013/0258369 A1* | 10/2013 | Suzuki | G06K 15/027 358/1.9 |
| 2015/0070737 A1* | 3/2015 | Hirata | H04N 1/6044 358/504 |
| 2015/0146053 A1* | 5/2015 | Satoh | H04N 9/045 348/279 |
| 2016/0080611 A1* | 3/2016 | Yorimoto | H04N 1/6094 358/509 |
| 2017/0057265 A1* | 3/2017 | Tsukada | H04N 1/0408 |
| 2017/0064142 A1* | 3/2017 | Tsukada | H04N 1/40068 |

FOREIGN PATENT DOCUMENTS

| | | |
|---|---|---|
| JP | 2010-120219 A | 6/2010 |
| JP | 2012-051241 A | 3/2012 |
| JP | 2014-050060 A | 3/2014 |

* cited by examiner

PRINTING APPARATUS AND CONTROL METHOD OF PRINTING APPARATUS

This application claims priority under 35 U.S.C. § 119 to Japanese Patent Application No. 2017-103374 filed on May 25, 2017, the entire disclosure of which is expressly incorporated by reference herein.

BACKGROUND

1. Technical Field

The present invention relates to a printing apparatus and a control method of the printing apparatus.

2. Related Art

In the related art, a technique of irradiating a print medium with light, capturing an image of a test pattern (measurement image) printed on the print medium, and acquiring captured image data of the captured test pattern is known (for example, refer to JP-A-2012-51241).

Generally, when the print medium is irradiated with light, a directional characteristic of light reflected from the print medium varies depending on a type of the print medium, a type of an ink ejected onto the print medium, or the like. For this reason, when the print medium is irradiated with light, brightness unevenness may occur on the print medium depending on the types. JP-A-2012-51241 does not consider that the directional characteristic of the reflected light varies depending on the types. As a result, an influence by light irradiation such as brightness unevenness may be included in the captured image data of the test pattern, and thus the captured image data with inappropriate image quality may be acquired.

SUMMARY

An advantage of some aspects of the invention is to be able to acquire the captured image data of the test pattern with appropriate image quality regardless of factors that can be influenced by light irradiation.

According to an aspect of the invention, there is provided a printing apparatus including: a transport mechanism configured to transport a print medium in a transport direction; a print head configured to print on the print medium; a camera configured to capture an image of the print medium; a light source configured to irradiate a capturing area of the camera with light at a predetermined angle with respect to a print surface of the print medium; a carriage configured to mount the print head, the camera, and the light source; and a processor configured to acquire reflectance characteristic data representing a reflectance characteristic of irradiation light from the light source based on a captured image obtained by capturing an image of a test pattern (a test image, a measurement image, an adjustment image) by the camera, the test pattern being printed on the print medium by the print head, determines (specifies) a specific range (an effective range) representing a range, in a direction corresponding to the transport direction, in which the reflectance is within a predetermined range based on the acquired reflectance characteristic data, and acquires captured image data representing the captured image corresponding to the specific range.

In this configuration, the captured image data corresponding to the specific range in which the reflectance of irradiation light from the light source is within a predetermined range can be acquired, and thus it is possible to suppress an influence by brightness unevenness caused by a type of the print medium, a type of an ink, or the like. Therefore, it is possible to acquire the captured image data of the test pattern with appropriate image quality regardless of factors that can be influenced by light irradiation.

In the printing apparatus, preferably, the processor configured to determine (specify) a transport range for transporting the print medium in the transport direction based on the specific range, cause the transport mechanism to transport the print medium in the transport direction by the determined transport range, cause the camera to capture an image of the test pattern, determine the specific range based on the captured image, execute acquisition processing of the captured image data corresponding to the specific range by a predetermined number of times, and acquire synthesized captured-image data by synthesizing pieces of the captured image data acquired by executing the acquisition processing by the predetermined number of times.

In this configuration, it is possible to acquire the synthesized captured-image data by synthesizing pieces of the captured image data acquired by executing the acquisition processing by a predetermined number of times. Therefore, it is possible to acquire the captured image data of the test pattern with appropriate image quality according to a length of the test pattern.

In the printing apparatus, preferably, the processor configured to determine a range in which the reflectance is within a predetermined range and which is a maximum range in a direction corresponding to the transport direction, as the specific range.

In this configuration, the range in which the reflectance of the light is within a predetermined range and which is a maximum range in a direction corresponding to the transport direction is determined as the specific range. Therefore, the number of times of capturing by the camera can be reduced, and a processing speed for acquiring the captured image data of the test pattern can be increased.

In the printing apparatus, preferably, the processor configured to detect density unevenness based on the synthesized captured-image data which is acquired.

In this configuration, density unevenness is detected based on the synthesized captured-image data which is acquired, and thus density unevenness can be detected based on the captured image data of the test pattern with appropriate image quality. Therefore, it is possible to detect density unevenness with high accuracy regardless of factors that can be influenced by light irradiation.

In the printing apparatus, preferably, the print head configured to include a nozzle for ejecting an ink, and the processor configured to adjust an amount of the ink to be ejected from the nozzle based on the detected density unevenness.

In this configuration, the amount of the ink to be ejected from the nozzle is adjusted based on the density unevenness detected with high accuracy, and thus the density unevenness can be suppressed with high accuracy.

According to another aspect of the invention, there is provided a control method of a printing apparatus configured to include a transport mechanism which transports a print medium in a transport direction and a carriage, the carriage mounting a print head which prints on the print medium, a camera which captures an image of the print medium, and a light source which irradiates a capturing area of the camera with light at a predetermined angle with respect to a print surface of the print medium, the method including: acquiring reflectance characteristic data representing a reflectance characteristic of irradiation light from the light source based on a captured image obtained by capturing an image of a test pattern by the camera, the test pattern being printed on the print medium by the print head; determining a specific range representing a range in a direction corresponding to the transport direction in which the reflectance is within a predetermined range based on the acquired reflectance characteristic data; and acquiring captured image data representing the captured image corresponding to the specific range.

In this configuration, the captured image data corresponding to the specific range in which the reflectance of irradiation light from the light source is within a predetermined range can be acquired, and thus it is possible to suppress an influence by brightness unevenness caused by a type of the print medium, a type of an ink, or the like. Therefore, it is possible to acquire the captured image data of the test pattern with appropriate image quality regardless of factors that can be influenced by light irradiation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
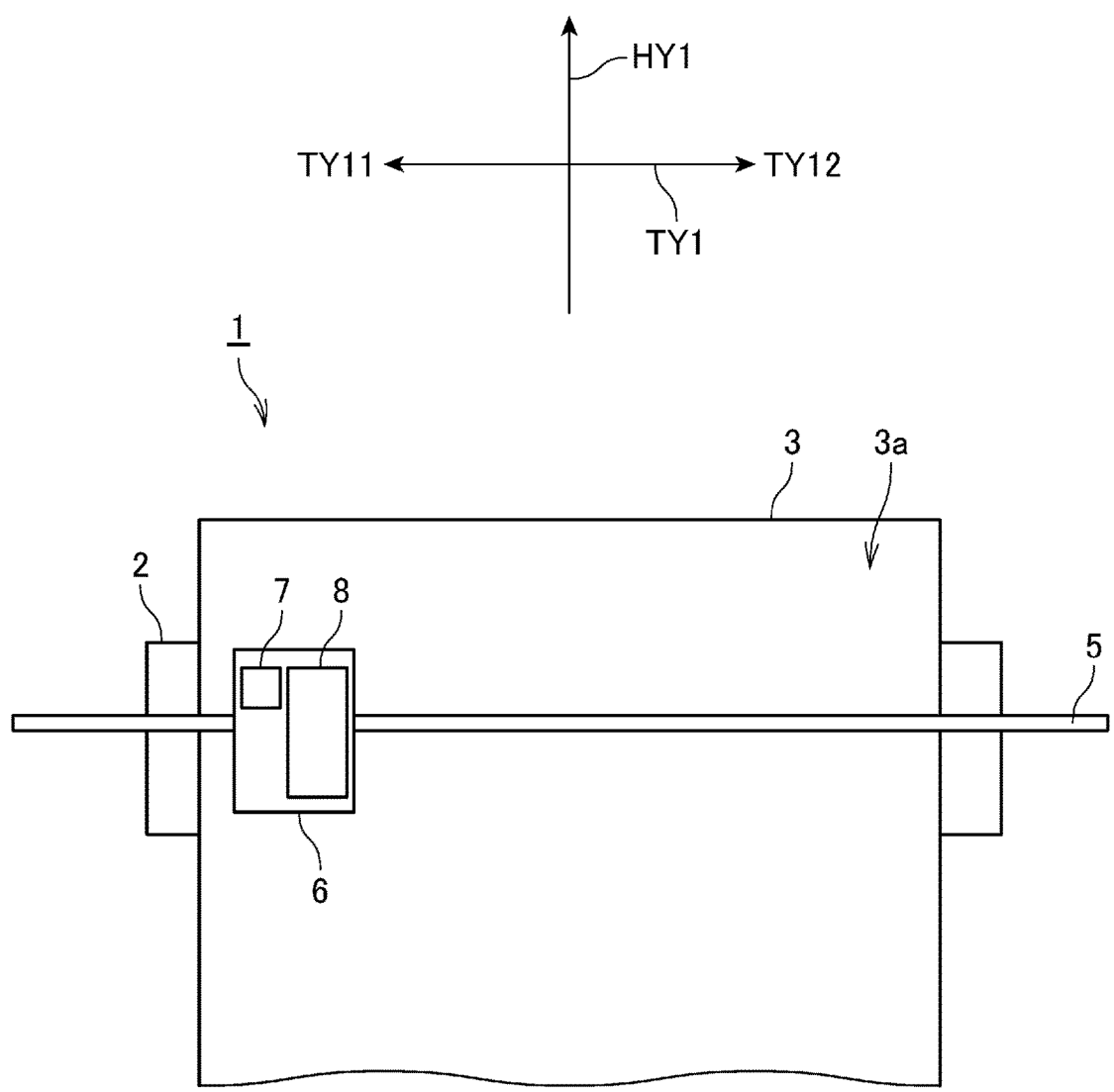
FIG. 1 is a schematic diagram illustrating a printing apparatus.

FIG. 1 is a schematic diagram illustrating a printing apparatus 1.

The printing apparatus 1 is an apparatus into which a print medium 3 is loaded and which has a function of executing printing on the loaded print medium 3 based on print data received from an external apparatus such as a host computer or print data stored in the printing apparatus 1.

Figure 4:
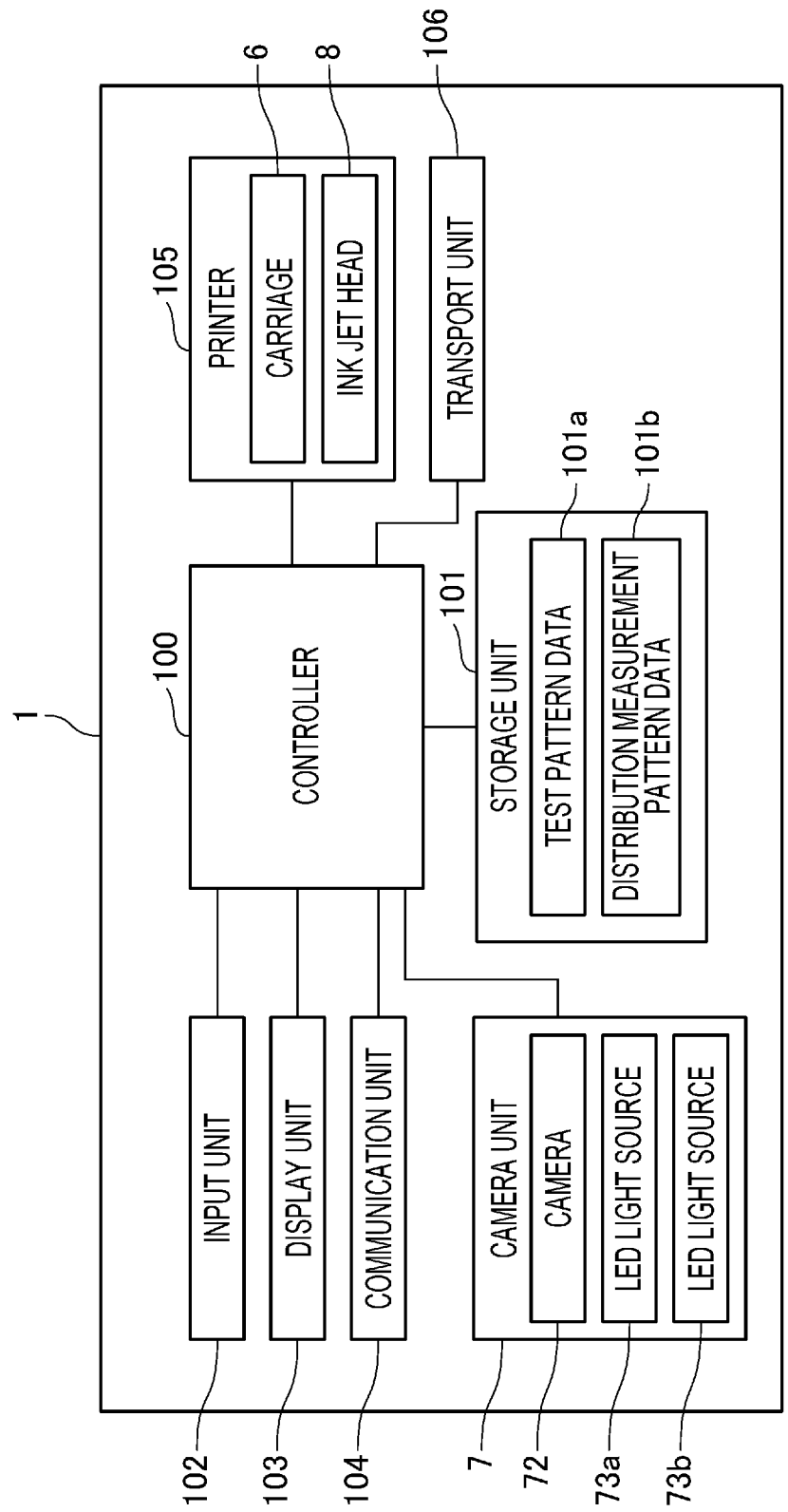
FIG. 4 is a diagram illustrating a functional configuration of the printing apparatus.

As illustrated in FIG. 1, the printing apparatus 1 includes a platen 2. A predetermined print medium 3 is transported on an upper surface of the platen 2 in a transport direction HY1 by a transport mechanism (transport unit) 106 (FIG. 4).

The print medium 3 is not limited to a paper medium, and means a medium such as a film or a fiber which can be loaded into the printing apparatus 1 and on which printing can be performed by the printing apparatus 1. The printing apparatus 1 according to the present embodiment is an ink jet printer that prints characters, images, and the like by forming dots by ejecting an ink onto the loaded print medium 3 using an ink jet head 8 (print head). In particular, the printing apparatus 1 according to the present embodiment is a so-called large format printer (LFP), and a large medium as the print medium 3 can be loaded into the printing apparatus 1. As an example of the print medium 3, in a case of cut paper, an "A0" size paper sheet can be loaded into the printing apparatus 1, and in a case of roll paper, a paper sheet having a width more than "900 mm" can be loaded into the printing apparatus 1.

A guide shaft 5 is provided above the platen 2, the guide shaft 5 extending in a perpendicular direction TY1 perpendicular to the transport direction HY1 of the print medium 3. A carriage 6 is provided on the guide shaft 5 so as to reciprocate along the guide shaft 5 by a drive mechanism. That is, the carriage 6 reciprocates along the guide shaft 5 in the perpendicular direction TY1. The perpendicular direction TY1 corresponds to a moving direction of the carriage 6.

A camera module (camera unit or camera board) 7 and an ink jet head 8 are mounted on the carriage 6 side by side in the perpendicular direction TY1. In FIG. 1, the camera module 7 is disposed on the carriage 6 closer to a direction TY11 than the ink jet head 8 is. In addition, the ink jet head 8 is disposed on the carriage 6 closer to a direction TY12 than the camera module 7 is. The camera module 7 will be described later.

Figure 2:
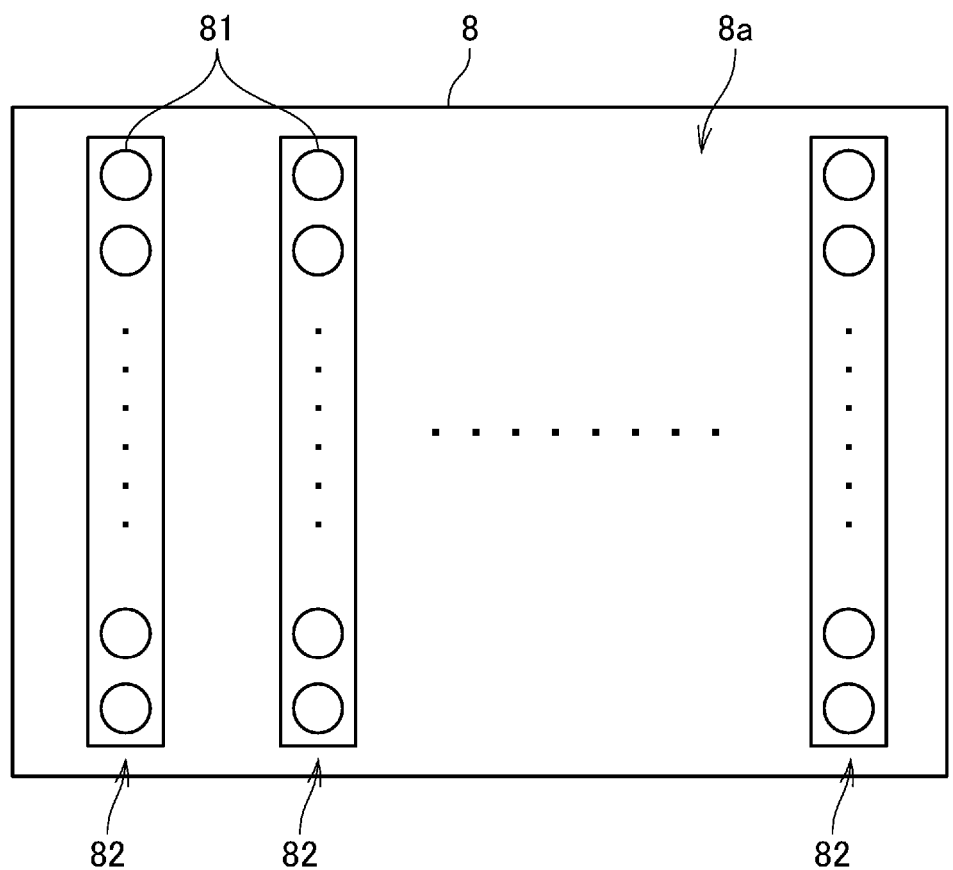
FIG. 2 is a diagram for explaining an ink jet head.

FIG. 2 is a diagram for explaining the ink jet head 8.

The ink jet head 8 includes a plurality of nozzle lines 82 formed by disposing a plurality of nozzles 81 which ejects an ink side by side in the transport direction HY1 on an ink ejection surface 8a facing a print surface 3a of the print medium 3. As illustrated in FIG. 2, the ink jet head 8 includes the plurality of nozzle lines 82 disposed side by side in the perpendicular direction TY1. The nozzles 81 included in the nozzle line 82 are disposed at regular intervals along the transport direction HY1. The ink jet head 8 includes the nozzle lines 82 for each color ink to be ejected onto the print medium 3. For example, in a case where colors of inks to be ejected are ten colors of cyan, magenta, yellow, light cyan, light magenta, gray, light gray, matte black, and photo black, the ink jet head 8 includes ten nozzle lines 82.

Returning to the explanation of FIG. 1, in the present embodiment, it is assumed that the direction TY12 in the printing apparatus 1 is a side on which a maintenance mechanism that performs maintenance such as cleaning of sucking an ink from an opening of the nozzle 81 is disposed (hereinafter, referred to as a "home position side"). On the other hand, in the present embodiment, it is assumed that the direction TY11 in the printing apparatus 1 is a side opposite to the home position side (hereinafter, referred to as "full side").

In a case where the maintenance mechanism is positioned in the direction TY11, where the direction TY11 is the home position side, and where the direction TY12 is the full side, the camera module 7 is disposed on the carriage 6 closer to the direction TY12 than the ink jet head 8 is.

In this manner, the camera module 7 is disposed on the carriage 6 closer to a side that is not the home position side than the ink jet head 8 is. Thereby, the camera module 7 does not interfere with the maintenance mechanism, and thus it is possible to prevent mist of the ink from adhering to the camera module 7. Therefore, it is possible to prevent a degradation in function of the camera module 7.

Next, the camera module 7 will be described.

Figure 3:
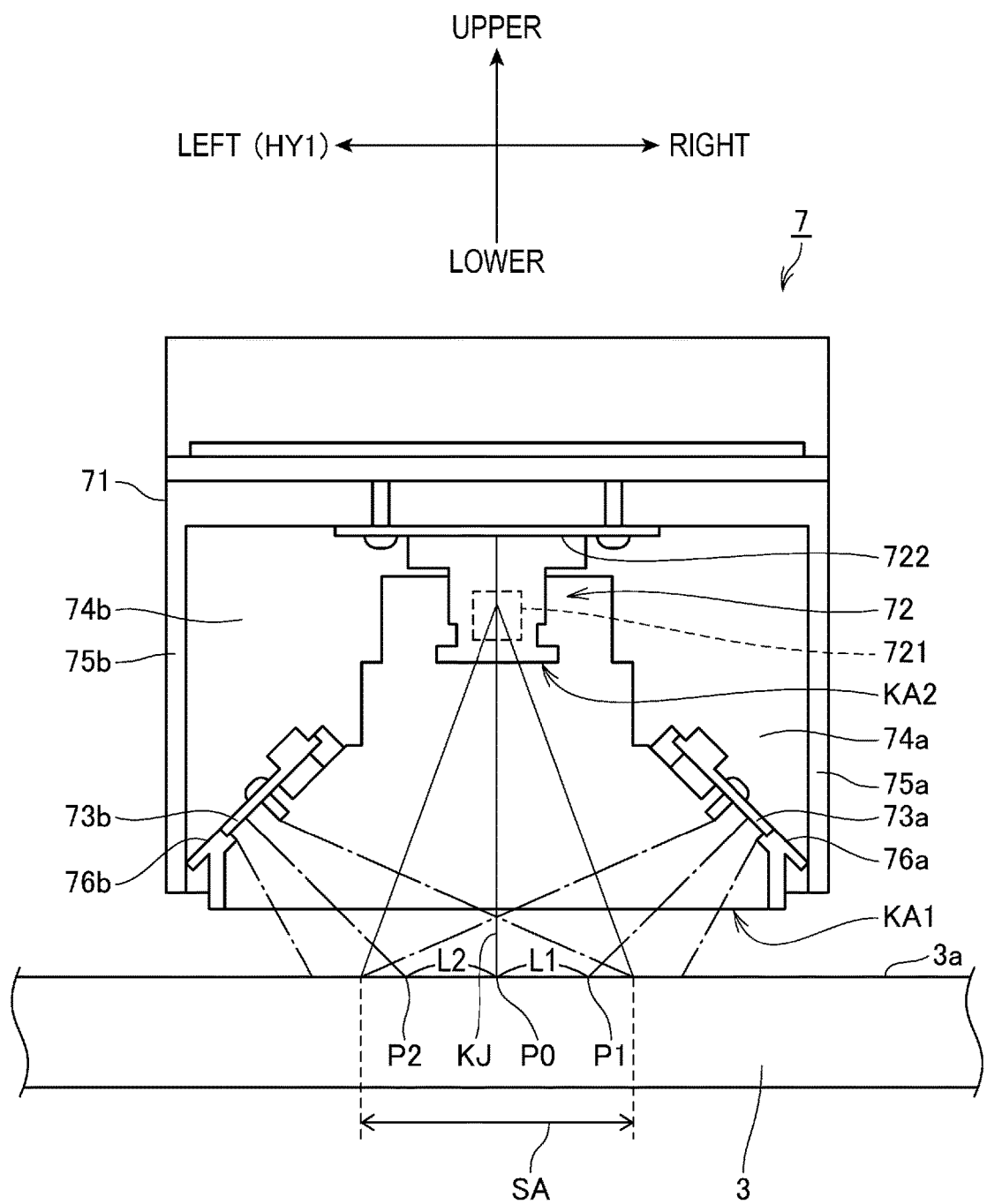
FIG. 3 is a diagram illustrating a configuration of a main portion of a camera module.

FIG. 3 is a diagram illustrating a configuration of a main portion of the camera module 7.

In an explanation of FIG. 3, as represented by arrows in FIG. 3, a left direction is referred to as a "left side", a right direction is referred to as a "right side", an upper direction is referred to as an "upper side", and a lower direction is referred to as a "lower side". The left side corresponds to the transport direction HY1.

As illustrated in FIG. 3, the camera module 7 is configured to include a housing 71, a camera 72, an LED light source 73a (light source), and an LED light source 73b (light source).

The housing 71 accommodates the camera 72, the LED light source 73a, and the LED light source 73b. The housing 71 is made of a material such as aluminum having a light weight and high thermal conductivity, and an opening KA1 is formed on a lower surface of the housing 71.

The camera 72 is disposed on an upper side of the inside of the housing 71. The camera 72 includes a lens (lens unit) 721 and a sensor 722. In addition, an opening KA2 is formed on a lower end of the camera 72. The sensor 722 is configured with an RGB image sensor including a plurality of pixels, and receives light via the opening KA1, the opening KA2, and the lens 721, the light with which a capturing area SA on the print surface 3a of the print medium 3 is irradiated and which is reflected from the capturing area SA. The sensor 722 outputs an electrical signal corresponding to an intensity of the reflected light that is received by each pixel. In addition, the sensor 722 captures an image of the capturing area SA on the print surface 3a of the print medium 3. In the present embodiment, the capturing area SA is a rectangular area in which a length in the transport direction HY1 is longer than a length in the perpendicular direction TY1. The sensor 722 is disposed such that an optical axis KJ of the reflected light to be received passes through the center point of the opening KA2 and the center point of the opening KA1.

The lens 721 forms an image by the reflected light, which is reflected from the capturing area SA on the print surface 3a of the print medium 3, on the sensor 722, and is configured with, for example, a combination of a plurality of lenses. The lens 721 is disposed such that an optical axis of the lens 721 matches the optical axis KJ.

The camera module 7 includes a light source fixing member 74a which is disposed on the right side inside the housing 71 and a light source fixing member 74b which is disposed on the left side inside the housing 71. A right end of the light source fixing member 74a is fixed to a right wall portion 75a of the housing 71, and an inclined portion 76a inclined with respect to the optical axis KJ is formed on a left end of the light source fixing member 74a. On the other hand, a left end of the light source fixing member 74b is fixed to a left wall portion 75b of the housing 71, and an inclined portion 76b inclined with respect to the optical axis KJ is formed on a right end of the light source fixing member 74b.

The LED light source 73a is disposed on the inclined portion 76a of the light source fixing member 74a. As illustrated in FIG. 3, the inclined portion 76a of the light source fixing member 74a is inclined such that an optical axis of light emitted from the LED light source 73a is positioned at a position P1 away from an intersection point P0 between the optical axis KJ and the print medium 3 to the right side by a predetermined distance L1. On the other hand, the LED light source 73b is disposed on the inclined portion 76b of the light source fixing member 74b. As illustrated in FIG. 3, the inclined portion 76b of the light source fixing member 74b is inclined such that an optical axis of light emitted from the LED light source 73b is positioned at a position P2 away from the intersection point P0 to the left side by a predetermined distance L2. An inclination of the light source fixing member 74a and an inclination of the light source fixing member 74b may be fixed, or may be changed by a predetermined mechanism. In this manner, the light source fixing member 74a and the light source fixing member 74b are inclined, and thus the LED light source 73a and the LED light source 73b irradiate the print surface 3a of the print medium 3 with light at a predetermined angle (for example, 45°).

As described above, the LED light source 73a irradiates the print surface 3a with light at a predetermined angle toward the position P1 positioned rightward from the intersection point P0 by the predetermined distance L1. Therefore, around the position P1, the print surface 3a of the print medium 3 is irradiated with light of which a light intensity decreases as a distance from the position P1 increases. On the other hand, the LED light source 73b irradiates the print surface 3a with light at a predetermined angle toward the position P2 positioned leftward from the intersection point P0 by the predetermined distance L2. Therefore, around the position P2, the print surface 3a of the print medium 3 is irradiated with light of which a light intensity decreases as a distance from the position P2 increases. Accordingly, the predetermined distance L1 and the predetermined distance L2 are appropriately set such that the capturing area SA is irradiated with light having a uniform light intensity. As the position P1 and the position P2 are positioned closer to the intersection point P0, in an upstream portion and a downstream portion of the capturing area SA in the transport direction HY1, the irradiation light intensity is decreased, and as a result, brightness unevenness occurs. On the other hand, as the position P1 and the position P2 are positioned farther from the intersection point P0, in the upstream portion and the downstream portion of the capturing area SA in the transport direction HY1, the light intensity is decreased, and as a result, brightness unevenness occurs. Therefore, the predetermined distance L1 and the predetermined distance L2 are appropriately set.

Next, a functional configuration of the printing apparatus 1 will be described.

FIG. 4 is a diagram illustrating a functional configuration of the printing apparatus 1.

As illustrated in FIG. 4, the printing apparatus 1 includes a controller 100, a storage (storage unit) 101, an input device (input circuit or input board) 102, a display (display unit) 103, a communication device (communication unit, communicator, transmitter and receiver, communication circuit or communication board) 104, the camera module 7, a printer 105, and a transport mechanism 106.

The controller 100 includes a CPU (processor), a ROM, a RAM, an ASIC, a signal processing circuit, and the like, and controls each component of the printing apparatus 1. In the controller 100, the CPU executes processing by, for example, reading a program such as firmware stored in the ROM or the storage 101 to be described, executes processing by, for example, a function implemented in the ASIC (logic circuit), and executes processing by, for example, cooperation of hardware and software such as signal processing by a signal processing circuit.

Figure 9:
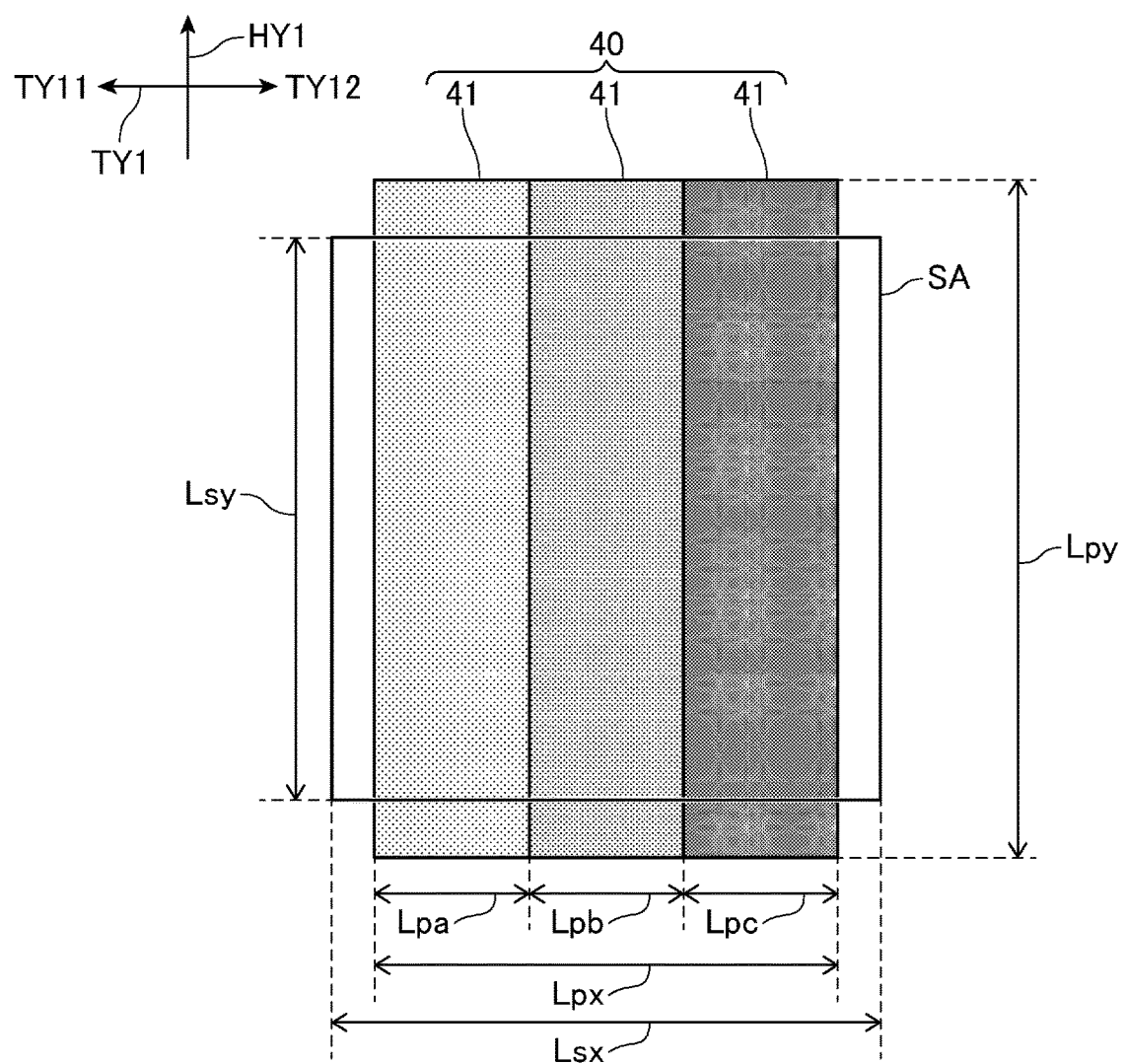
FIG. 9 is a diagram illustrating an example of a distribution measurement pattern.

The storage 101 includes a nonvolatile memory such as a hard disk or an EEPROM, and stores various data so as to be rewritable. In addition, the storage 101 stores test pattern data 101a which is data for printing a test pattern 50 (FIG. 13A), and distribution measurement pattern data 101b which is data for printing a distribution measurement pattern 40 (FIG. 9). The test pattern 50 and the distribution measurement pattern 40 will be described later.

The input device 102 includes an input section such as an operation panel or a touch panel provided in the printing apparatus 1, detects a user's operation on the input section, and outputs the detected operation to the controller 100. The controller 100 executes processing corresponding to the operation on the input section based on the input from the input device 102.

The display 103 includes a plurality of LEDs, a display panel, and the like, and turns on/off the LEDs in a predetermined manner or displays information on the display panel under a control of the controller 100.

Under the control of the controller 100, the communication device 104 performs a communication with an external apparatus such as a host computer according to a predetermined communication standard.

The camera module 7 includes the camera 72, the LED light source 73a, and the LED light source 73b. As described above, the camera 72 includes the lens 721 and the sensor 722, captures an image of the capturing area SA on the print surface 3a of the print medium 3, and outputs captured image data of the captured image to the controller 100. Under the control of the controller 100, electric power is supplied to the LED light source 73a and the LED light source 73b, and thus the LED light source 73a and the LED light source 73b irradiate the print surface 3a of the print medium 3 with light.

The printer 105 includes the ink jet head 8 that forms dots by ejecting an ink onto the print medium 3 loaded into the printing apparatus 1, the carriage 6 that scans the ink jet head 8 in a scanning direction, a carriage drive motor that drives the carriage 6, a heater that dries the print medium 3 onto which the ink is adhered, and other configurations related to the printing on the print medium 3. The controller 100 performs a control such that the printer 105 forms dots by ejecting the ink onto the print medium 3 loaded into the printing apparatus 1. Thereby, characters, images, and the like are printed.

The transport mechanism 106 includes a transport roller for transporting the print medium 3 in the transport direction HY1, a transport motor for rotating the transport roller, a motor driver for driving the transport motor, and other configurations related to the transporting of the print medium 3. The transport mechanism 106 transports the print medium 3 under the control of the controller 100.

Next, a basic operation of the printing apparatus 1 will be described.

Figure 5:
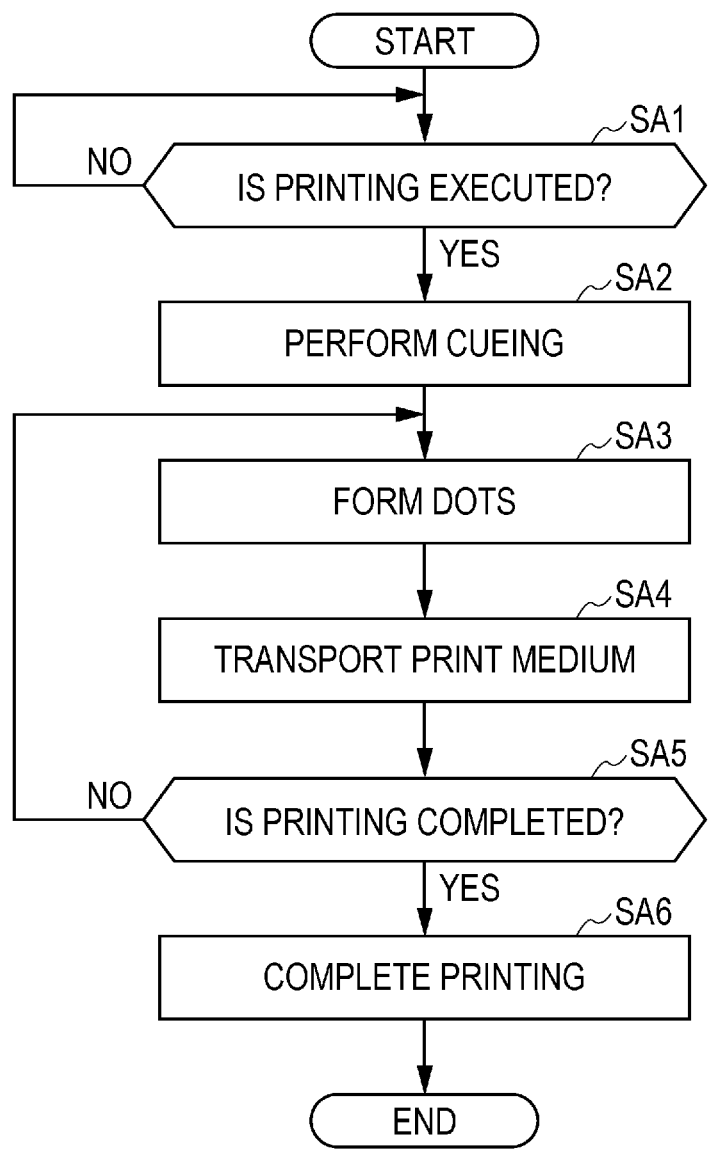
FIG. 5 is a flowchart illustrating a basic operation of the printing apparatus.

FIG. 5 is a flowchart illustrating a basic operation of the printing apparatus 1.

The controller 100 of the printing apparatus 1 determines whether to execute printing (step SA1). For example, in a case where print data is received from the host computer via the communication device 104, in response to the reception of the print data, the controller 100 determines to execute printing (YES in step SA1). In addition, for example, in a case where the input device 102 detects an operation instructing an execution of printing, the controller 100 determines to execute printing based on the input from the input device 102 (YES in step SA1).

When it is determined that printing is to be executed (YES in step SA1), the controller 100 performs a control such that the transport mechanism 106 performs a so-called cueing (step SA2) of transporting the print medium 3 to a position at which the printing is to be started.

Next, the controller 100 performs a control such that the ink jet head 8 of the printer 105 forms dots on the print surface 3a of the print medium 3 by ejecting the ink (step SA3). When step SA3 is executed, the controller 100 controls the carriage transport motor such that the carriage 6 moves in the perpendicular direction TY1, and thus the ink is intermittently ejected from the ink jet head 8 during the movement of the carriage 6. The ink is landed onto the print surface 3a of the print medium 3, and thus the dots are formed on the print surface 3a of the print medium 3. Here, in order to eject the ink from the nozzles while moving the carriage 6 in the perpendicular direction TY1, a dot line including a plurality of dots along the perpendicular direction TY1 (hereinafter, referred to as a "raster line") is formed on the print surface 3a of the print medium 3.

Next, when a raster line is formed by the ejection of the ink in step SA3, the controller 100 causes the transport mechanism 106 to transport the print medium 3 in the transport direction HY1 (step SA4). As described above, the controller 100 causes the transport mechanism 106 to transport the print medium 3 in the transport direction HY1 after step SA3, and thus dots can be formed at positions different from positions of the dots formed in step SA3.

Next, the controller 100 determines whether or not printing on the print medium 3 is completed (step SA5). For example, in a case where it is determined that printing is executed for all of data to be printed on the print medium 3 based on the print data, the controller 100 determines that printing is completed (YES in step SA5). On the other hand, for example, in a case where it is determined that printing is not executed for all of data to be printed on the print medium 3 based on the print data, the controller 100 determines that printing is not completed (NO in step SA5).

In a case where it is determined that printing on the print medium 3 is not completed (NO in step SA5), the controller 100 returns to the processing of step SA3, and performs a control such that formation of dots and transport of the print medium 3 are repeated until printing is completed for all of data to be printed.

On the other hand, in a case where it is determined that printing on the print medium 3 is completed (YES in step SA5), the controller 100 completes printing on the print medium 3 (step SA6).

In this manner, the controller 100 of the printing apparatus 1 performs the processing of step SA3 such that a raster line along the perpendicular direction TY1 is formed. In the following description, formation of dots according to one movement of the carriage 6 in the perpendicular direction TY1 is expressed to as a "path". In addition, in the following description, a printing mode in which a non-printed raster line is interposed between raster lines printed by one path in the transport direction HY1 is expressed as interlace printing.

Figure 6:
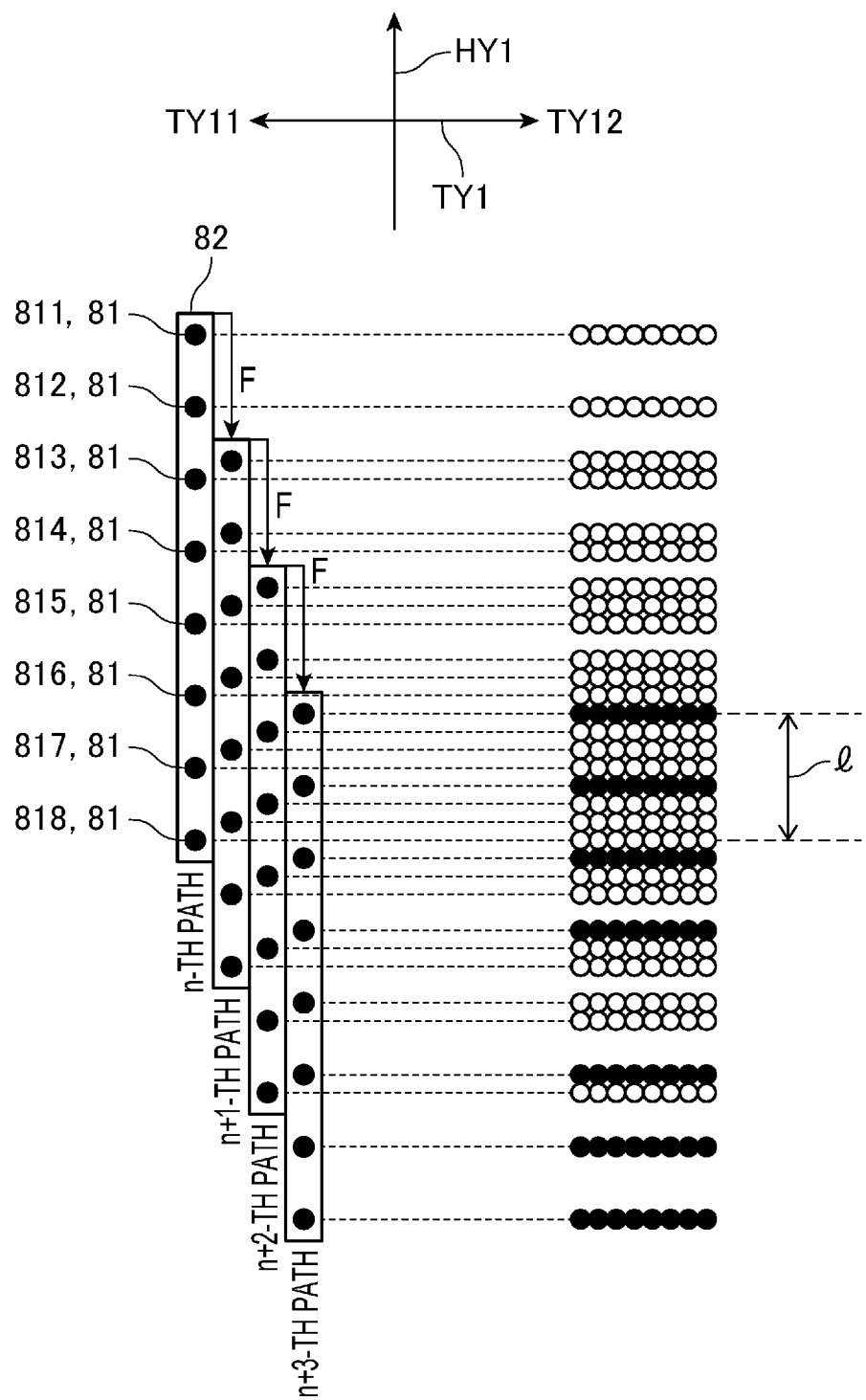
FIG. 6 is a diagram for explaining interlace printing.

FIG. 6 is a diagram for explaining interlace printing.

FIG. 6 is a diagram for explaining a case where a head length, which is a length of the head, is filled with raster lines by four paths in interlace printing. In FIG. 6, positions of the carriage 6 in an n-th path to an n+3-th path and a state of formation of the dots are illustrated. The n-th path represents an n-th round path. In the present embodiment, the head length is a separation distance from the nozzle 81 positioned on the most upstream side of the nozzle line 82 to the nozzle 81 positioned on the most downstream side of the nozzle line 82 in the transport direction HY1.

For convenience of explanation, in FIG. 6, one nozzle line 82 among the plurality of nozzle lines 82 is illustrated. In addition, for convenience of explanation, in FIG. 6, it is assumed that the nozzle line 82 includes a nozzle 811, a nozzle 812, a nozzle 813, a nozzle 814, a nozzle 815, a nozzle 816, a nozzle 817, and a nozzle 818. In a case where one nozzle 81 is illustrated without distinguishing the nozzle 811 to the nozzle 818, the nozzle is referred to as a nozzle 81.

In FIG. 6, although it is illustrated that the nozzle line 82 moves on the print medium 3, FIG. 6 is a diagram illustrating relative positions between the carriage 6 and the print medium 3, and actually, the print medium 3 moves in the transport direction HY1. In addition, in FIG. 6, although it is illustrated that only several dots are formed, the ink is intermittently ejected from the nozzle 81 moving in the perpendicular direction TY1, and thus, many dots are actually formed in the perpendicular direction TY1. In addition, in FIG. 6, black dots represent dots formed by the last path, and white dots represent dots formed by paths other than the last path.

In interlace printing, every time the print medium 3 is transported in the transport direction HY1 by a certain transport amount F, each nozzle 81 prints a raster line at a position directly above the raster line printed by the immediately previous path, that is, on the downstream side in the transport direction HY1. For example, when performing interlace printing, in an n-th path, raster lines are printed by ejecting the ink from the nozzle 818 and the nozzle 817, in an n+1-th path, raster lines are printed by ejecting the ink from the nozzle 816 and the nozzle 815 on the downstream side of the raster lines printed by the nozzle 818 and the nozzle 817 in the transport direction HY1, in an n+2-th path, raster lines are printed by ejecting the ink from the nozzle 814 and the nozzle 813 on the downstream side of the raster lines printed by the nozzle 816 and the nozzle 815 in the transport direction HY1, and in an n+3-th path, raster lines are printed by ejecting the ink from the nozzle 812 and the nozzle 811 on the downstream side of the raster lines printed by the nozzle 814 and the nozzle 813 in the transport direction HY1. Thereby, an image having a length 1, which is a quarter of the nozzle length in the transport direction HY1, is printed on the print medium 3.

The transport amount F is changed according to resolution of an image to be printed on the print medium 3. Generally, in a case where the printing apparatus 1 performs printing at low resolution and high speed, the transport amount F increases according to the printing speed. In addition, in a case where the printing apparatus 1 performs printing at high resolution and low speed, the transport amount F decreases as compared with the case where printing is performed at high speed. In other words, the transport amount F in a case of filling an area corresponding to the head length in the transport direction HY1 with the number of paths is a value obtained by dividing the head length by the number of paths. Therefore, in a case where printing is performed at high resolution, the number of paths increases.

In such interlace printing, density unevenness occurs in sometimes.

In the following description, a "unit area" represents a rectangular area which is virtually determined on the print surface 3a of the print medium 3, and a size and a shape of the area are determined according to printing resolution. For example, in a case where the printing resolution is 720 dpi (dot/inch) (perpendicular direction TY1)×720 dpi (transport direction HY1), the unit area is an area having a size of approximately 35.28 μm (micrometer)×35.28 μm ($\cong$1/720 inch×1/720 inch) and a square shape. In addition, in a case where the printing resolution is 360 dpi (perpendicular direction TY1)×720 dpi (transport direction HY1), the unit area is an area having a size of approximately 70.56 μm×35.28 μm ($\cong$1/360 inch×1/720 inch) and a rectangle shape. When the ink is ideally ejected, the ink lands at the center position of the unit area, and then the ink spreads on the print medium 3, thereby forming dots in the unit area. One unit area corresponds to one pixel for the print data. In addition, since each pixel corresponds to each unit area, pixel data representing each pixel also corresponds to each unit area.

In addition, in the following description, a "line area" represents an area configured with a plurality of unit areas disposed side by side in the perpendicular direction TY1. For example, in a case where the printing resolution is 720 dpi×720 dpi, the line area is a band-shaped area having a width of 35.28 μm ($\cong$1/720 inch) in the transport direction HY1. When the ink is ideally and intermittently ejected from the nozzle 81 moving in the perpendicular direction TY1, a raster line is formed on the line area. A plurality of pixels disposed side by side in the perpendicular direction TY1 are associated with the line area.

Figure 7A:
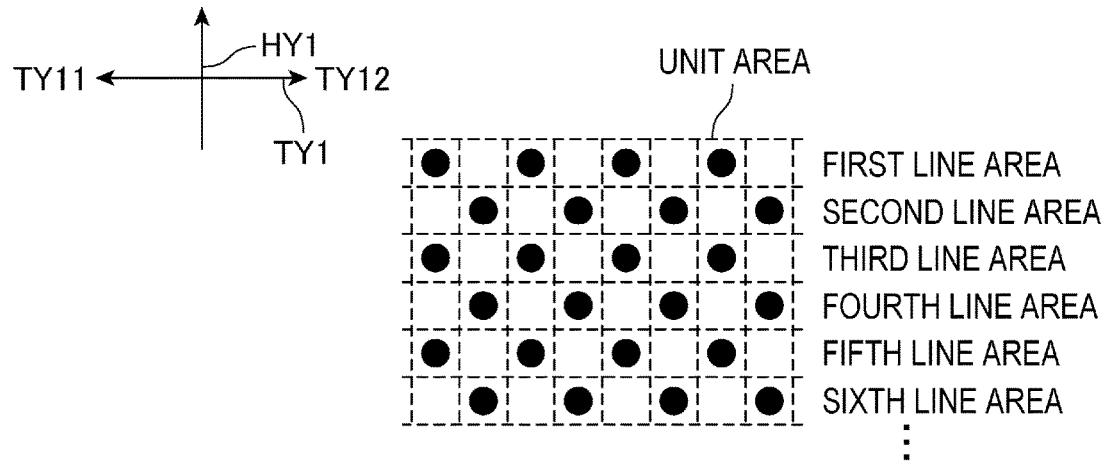
FIG. 7A is a diagram illustrating an example of dots formed with an ideal density.

FIG. 7A is a diagram illustrating an example of dots formed with an ideal density. In FIG. 7A, since the dots are ideally formed, each dot is appropriately formed on the unit area, and the raster line is appropriately formed in the line area. In FIG. 7A, the line area is illustrated as an area surrounded by dotted lines, and here is an area having a width of 720 dpi. In each line area, an image piece having a density corresponding to coloring of the area is formed. Here, for simplicity of explanation, it is assumed that an image having a density for obtaining a dot generation rate of 50% is printed.

Figure 7B:
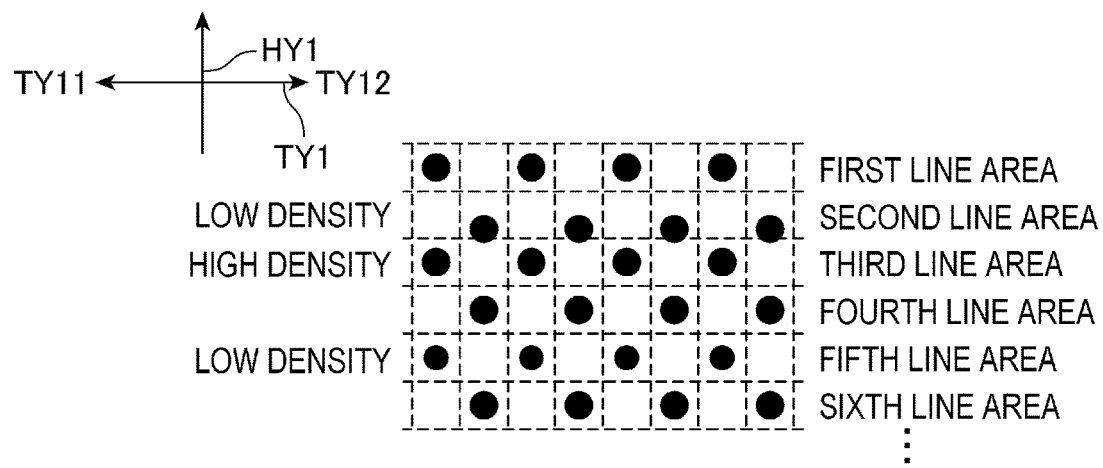
FIG. 7B is a diagram illustrating an example of dots formed in a case where density unevenness occurs.

FIG. 7B is a diagram illustrating an example of dots formed in a case where density unevenness occurs. Here, due to a variation in a flight direction of the ink ejected from the nozzle 81, the raster line formed in a second line area is formed close to a third line area (upstream side in the transport direction HY1). In addition, an amount of the ink ejected toward a fifth line area is small, and dots formed in the fifth line area are smaller than dots formed in other line areas. In such a case, the second line area and the fifth line area have a density lower than the original density, and this results in density unevenness, a so-called white streak (white stripe). In addition, the third line area has a density higher than the original density, and this results in density unevenness, a so-called black streak (black stripe).

Figure 7C:
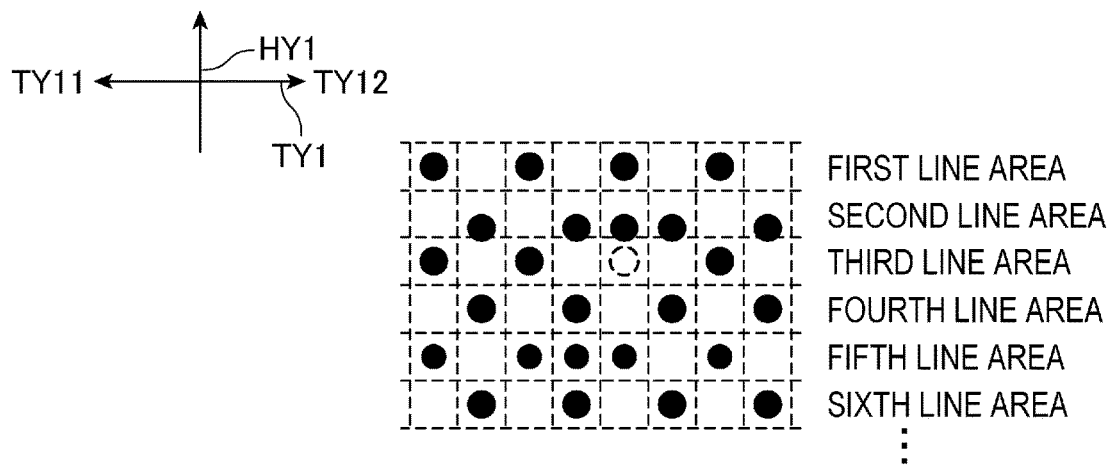
FIG. 7C is a diagram illustrating an example of dots formed so as to suppress density unevenness.

FIG. 7C is a diagram illustrating an example of dots formed so as to suppress density unevenness. In the present embodiment, for a line area which is likely to be visually recognized as a dark area, the dot generation rate in the line area is corrected such that a light image piece is formed. In addition, for a line area which is likely to be visually recognized as a light area, the dot generation rate in the line area is corrected such that a dark image piece is formed. For example, in FIG. 7C, a gradation value of a pixel corresponding to each line area is corrected so as to increase the dot generation rate in the second line area, decrease the dot generation rate in the third line area, and increase the dot generation rate in the fifth line area. Therefore, the dot generation rate of the raster line in each line area is changed, and thus a density of an image piece in each line area is corrected. Thereby, density unevenness of the entire print image is suppressed.

In FIG. 7B, the density of the image piece formed in the third line area is increased, not by an influence of the nozzle 81 forming the raster line in the third line area, but by an influence of the nozzle 81 forming the raster line in the adjacent second line area. For this reason, in a case where the nozzle 81, which forms a raster line in the third line area, forms a raster line in another line area, the density of the image piece formed in the line area is not necessarily increased. That is, even though an image piece is formed by the same nozzle 81, when the nozzle 81 forming an adjacent image piece is different, a density of the adjacent image piece may be different in some cases. In such a case, it is difficult to suppress density unevenness only by a correction value associated with the nozzle 81. Therefore, in the present embodiment, a gradation value of the pixel data is corrected based on the correction value set for each line area.

As described above, the printing apparatus 1 calculates the correction value for correcting density unevenness for each line area, and sets the calculated correction value for each line area. Thus, density unevenness can be suppressed. Here, when calculating the correction value for correcting density unevenness, the printing apparatus 1 captures an image of the test pattern 50 printed on the print medium 3 by the camera 72 of the camera module 7 mounted on the carriage 6, acquires characteristics of density unevenness based on captured image data representing the captured image, and calculates the correction value in which the characteristics are reflected. The printing apparatus 1 stores the calculated correction value in the storage (storage unit) 101 or the like, generates the print data while correcting the dot generation rate for each line area based on the stored correction value, and performs printing.

As described above, in the present embodiment, the camera module 7 includes the LED light source 73a and the LED light source 73b, and irradiates the print surface 3a of the print medium 3 with light at a predetermined angle. For this reason, in the capturing area SA, an irradiation amount of light and a reflection amount of light tend to increase in the vicinity of the LED light source 73a and the LED light source 73b. As a result, in the capturing area SA which is captured by the camera 72, brightness unevenness may occur. When brightness unevenness occurs, the captured image data representing the captured image includes the brightness unevenness, and as a result, the printing apparatus 1 cannot acquire accurate characteristics of density unevenness.

For this reason, in the related art, shading correction is known as a method of reducing brightness unevenness included in the captured image data. The shading correction is a method of reducing brightness unevenness included in the captured image data, and, for example, a method of correcting a gradation value of each pixel in the captured image data by dividing pixel data of each pixel in the corresponding captured image data by pixel data of each pixel in white reference data. The white reference data is captured image data representing a captured image obtained by capturing a white plate with a uniform density in a state where the white plate is irradiated with light.

Generally, a directional characteristic of the reflected light varies depending on a type of the print medium 3, a type of the ink ejected onto the print medium 3, or the like. That is, reflectance of the irradiation light on the print surface 3a of the print medium 3 varies depending on a type of the print medium 3, a type of the ink printed on the print medium 3, or the like. For this reason, when the print surface 3a of the print medium 3 is irradiated with light, brightness unevenness caused by the types may occur. On the other hand, it cannot be said that the brightness unevenness is uniformly reduced in the captured image data by the shading correction. This is because the shading correction is based on the white reference data and the captured image data and there is a possibility that brightness unevenness included in the white reference data is different from brightness unevenness included in the captured image data. Therefore, in order to accurately correct density unevenness based on the captured image data of the test pattern 50, it is desirable to acquire the captured image data of the test pattern 50 with reduced brightness unevenness, regardless of a type of the print medium 3, a type of the ink ejected onto the print medium 3, or the like.

Therefore, the printing apparatus 1 according to the present embodiment performs the following operation.

Figure 8:
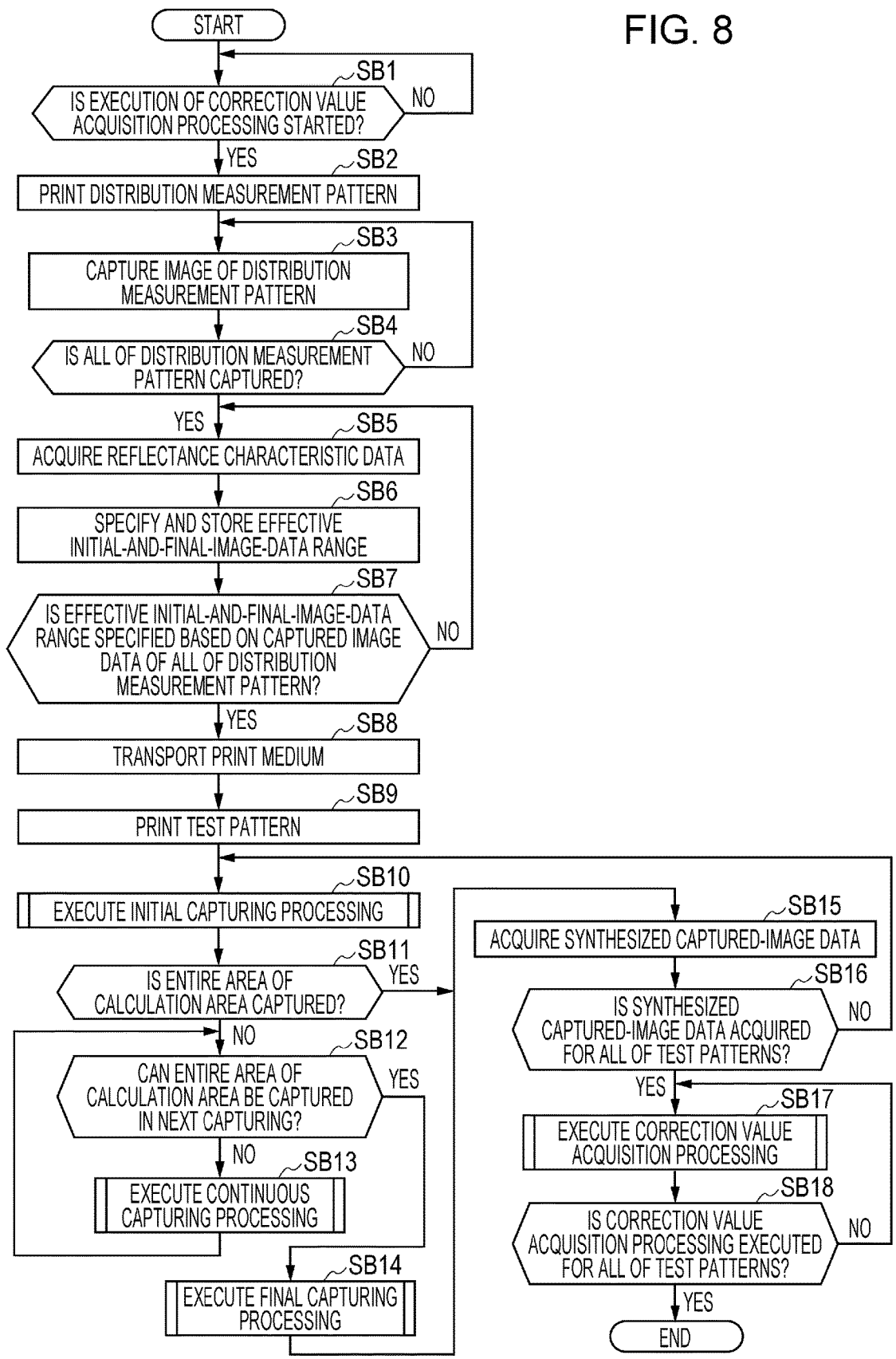
FIG. 8 is a flowchart illustrating an operation of the printing apparatus.

FIG. 8 is a flowchart illustrating an operation of the printing apparatus 1.

The operation of the printing apparatus 1 illustrated in FIG. 8 illustrates an operation up to correction value acquisition processing of acquiring a correction value for correcting density unevenness.

The controller 100 of the printing apparatus 1 determines whether to start an execution of correction value acquisition processing of acquiring a correction value for correcting density unevenness (hereinafter, referred to as "density unevenness correction value") (step SB1). For example, in a case where the input device 102 detects an operation instructing an execution of the correction value acquisition processing, the controller 100 determines to start an execution of the correction value acquisition processing based on the input from the input device 102 (YES in step SB1). In addition, for example, in a case where a predetermined time period elapses after the previous execution of the correction value acquisition processing, the controller 100 determines to start an execution of the correction value acquisition processing in response to the elapse of the time period (YES in step SB1). In addition, for example, in a case where power is initially supplied to the printing apparatus 1, the controller 100 determines to start an execution of the correction value acquisition processing in response to the power supply (YES in step SB1).

When determining to start an execution of the correction value acquisition processing (YES in step SB1), the controller 100 causes the printer 105 to print the distribution measurement pattern 40 on the print surface 3a of the print medium 3, based on the distribution measurement pattern data 101b stored in the storage 101 (step SB2).

FIG. 9 is a diagram illustrating an example of the distribution measurement pattern 40.

As illustrated in FIG. 9, the distribution measurement pattern 40 is a pattern image in which a plurality of band-shaped areas 41 elongated in the transport direction HY1 are disposed side by side in the perpendicular direction TY1, and is a pattern image similar to the test pattern 50 to be described. The controller 100 causes the printer 105 to print the distribution measurement pattern 40 such that densities in one band-shaped area 41 become the same density and the adjacent band-shaped areas 41 have different densities from each other. The density corresponds to the dot generation rate described above. In the present embodiment, the distribution measurement pattern 40 includes three band-shaped areas 41 of a band-shaped area 41 having a density of 70%, a band-shaped area 41 having a density of 80%, and a band-shaped area 41 having a density of 90% in order from the direction TY11 (that is, the full side) along the perpendicular direction TY1.

The distribution measurement pattern 40 is formed corresponding to the ink of each color. For example, in a case where ten nozzle lines 82 are provided in the ink jet head 8 corresponding to ten colors, the controller 100 causes the printer 105 to print ten distribution measurement patterns 40 on the print medium 3. In FIG. 9, although an example in which three band-shaped areas 41 are provided in one distribution measurement pattern 40 is illustrated, more or fewer band-shaped areas 41 having different densities may be provided. In addition, in a case where the band-shaped areas 41 do not fit into one distribution measurement pattern 40, a plurality of distribution measurement patterns 40 may be provided. For example, a distribution measurement pattern 40 including three band-shaped areas 41 having densities of 10%, 20%, and 30% and a distribution measurement pattern 40 including three band-shaped areas 41 having densities of 70%, 80%, and 90% may be provided, respectively.

A length of the distribution measurement pattern 40 in the perpendicular direction TY1 has a dimension Lpx. The dimension Lpx is determined by a dimension Lpa representing a length of the band-shaped area 41 having a density of 70% in the perpendicular direction TY1, a dimension Lpb representing a length of the band-shaped area 41 having a density of 80% in the perpendicular direction TY1, and a dimension Lpc representing a length of the band-shaped area 41 having a density of 90% in the perpendicular direction TY1. Preferably, the dimension Lpx is shorter than a dimension Lsx representing a length of the capturing area SA of the camera 72 in the perpendicular direction TY1. When the dimension Lpx is longer than the dimension Lsx, it is difficult to reduce a predetermined noise included in reflectance characteristic data (to be described) acquired from each of the band-shaped areas 41, or it is difficult to reliably acquire the reflectance characteristic data (to be described) from each of the three band-shaped areas 41.

In addition, a length of the distribution measurement pattern 40 in the transport direction HY1 has a dimension Lpy. Preferably, the dimension Lpy is at least equal to or larger than a dimension Lsy representing a length of the capturing area SA of the camera 72 in the transport direction HY1. In this case, an area of the capturing area SA in the transport direction HY1 is filled with the distribution measurement pattern 40. In this manner, by filling the capturing area SA with the distribution measurement pattern 40, reflectance characteristic data of a margin other than the distribution measurement pattern on the print medium 3 is not acquired.

Returning to the explanation of the flowchart of FIG. 8, when the distribution measurement pattern 40 is printed on the print surface 3a of the print medium 3, the controller 100 of the printing apparatus 1 causes the camera 72 to capture an image of the printed distribution measurement pattern 40 (step SB3). When capturing the image of the distribution measurement pattern 40 in step SB3, the controller 100 adjusts a position of the carriage 6 in the perpendicular direction TY1 and a position of the print medium 3 by controlling the printer 105 and the transport mechanism 106 such that a relationship between a position of the capturing area SA of the camera 72 and a position of the distribution measurement pattern 40 is made as illustrated in FIG. 9. That is, the controller 100 adjusts the position of the carriage 6 in the perpendicular direction TY1 and the position of the print medium 3 such that the area of the capturing area SA in the perpendicular direction TY1 includes an area of the distribution measurement pattern 40 in the perpendicular direction TY1, and such that the area of the capturing area SA in the transport direction HY1 is filled with the distribution measurement pattern 40. In a case where the dimension Lsx and the dimension Lsy of the capturing area SA, the dimension Lpx and the dimension Lpy of the distribution measurement pattern, and the printed position of the distribution measurement pattern 40 on the print surface 3a can be acquired, the controller 100 can uniquely adjust the position of the carriage 6 in the perpendicular direction TY1 and the position of the print medium 3.

When the camera 72 captures an image, the controller 100 causes the LED light source 73a and the LED light source 73b to irradiate the print surface 3a of the print medium 3 with light by supplying power to the LED light source 73a and the LED light source 73b.

Next, the controller 100 determines whether or not all of the printed distribution measurement pattern 40 is captured (step SB5). As described above, the controller 100 causes the printer 105 to print the distribution measurement pattern corresponding to the ink of each color. Therefore, the controller 100 determines whether or not all of the distribution measurement pattern 40 of each color corresponding to the ink ejected by the ink jet head 8 is captured by the camera 72.

In a case where it is determined that all of the printed distribution measurement pattern 40 is not captured (NO in step SB4), the controller 100 returns to step SB3, and causes the camera 72 to capture an image of the non-captured distribution measurement pattern 40.

On the other hand, in a case where it is determined that all of the printed distribution measurement pattern 40 is captured (YES in step SB4), the controller 100 acquires the reflectance characteristic data for each of the band-shaped areas 41 included in the distribution measurement pattern based on the captured image data representing the captured image of the distribution measurement pattern 40 (step SB5).

Here, step SB5 will be described in detail.

Figure 10A:
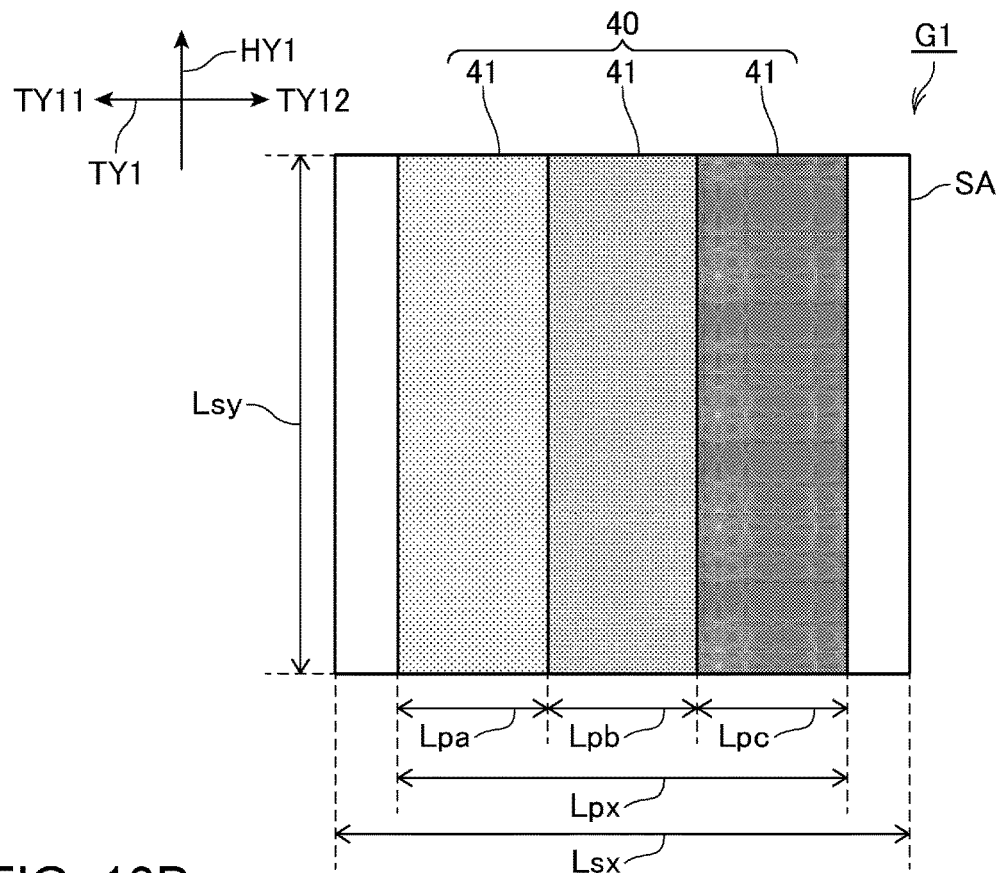
FIG. 10A is a diagram illustrating an example of a captured image of the distribution measurement pattern.

FIG. 10A is a diagram illustrating an example of a captured image G1 of the distribution measurement pattern 40.

Since the captured image G1 illustrated in FIG. 10A is a captured image obtained by capturing the capturing area SA illustrated in FIG. 9, the captured image G1 is a captured image of an area corresponding to the capturing area SA of the camera 72. As illustrated in FIG. 10A, the captured image G1 is a rectangular-shaped captured image, a length of the captured image G1 in the perpendicular direction TY1 (a direction corresponding to one movement direction of the carriage 6) has a dimension Lsx, and a length of the captured image G1 in the transport direction HY1 (a direction corresponding to the direction in which the print medium 3 is transported by the transport mechanism 106) has a dimension Lsy.

As illustrated in FIG. 10A, the captured image G1 is a captured image including three band-shaped areas 41 of the distribution measurement pattern 40. The three band-shaped areas 41 included in the captured image G1 are a band-shaped area 41 having a density of 70%, a band-shaped area 41 having a density of 80%, and a band-shaped area 41 having a density of 90%, which are disposed in order from the direction TY11 toward the direction TY12 (a direction corresponding to the other movement direction of the carriage 6). In the band-shaped area 41 having a density of 70% included in the captured image G1, a length in the perpendicular direction TY1 has a dimension Lpa, and a length in the transport direction HY1 has a dimension Lsy. In addition, in the band-shaped area 41 having a density of 80% included in the captured image G1, a length in the perpendicular direction TY1 has a dimension Lpb, and a length in the transport direction HY1 has a dimension Lsy. In addition, in the band-shaped area 41 having a density of 90% included in the captured image G1, a length in the perpendicular direction TY1 has a dimension Lpc, and a length in the transport direction HY1 has a dimension Lsy.

Based on the captured image data representing the captured image G1, the controller 100 acquires reflectance characteristic data representing a reflectance characteristic which is a reflectance characteristic of the irradiation light, for each of the band-shaped area 41 having a density of 70%, the band-shaped area 41 having a density of 80%, and the band-shaped area 41 having a density of 90%.

When acquiring the reflectance characteristic data, the controller 100 determines (specifies) the band-shaped area 41 having a density of 70%, the band-shaped area 41 having a density of 80%, and the band-shaped area 41 having a density of 90% in the capturing area SA. Here, an example of specifying the band-shaped area 41 having a density of 70% in the capturing area SA will be described. First, the controller 100 specifies the dimension Lsy, which is the length of the capturing area SA in the transport direction HY1, as the length of the band-shaped area 41 having a density of 70% in the transport direction HY1. Next, based on a gradation value of a pixel in the perpendicular direction TY1, the controller 100 specifies a length from a position of a pixel of which a gradation value is changed from a gradation value of a margin pixel to another gradation value from the direction TY11 toward the direction TY12 to a position of a pixel away from the position of the pixel having the changed gradation value by the dimension Lpa in the direction TY12, as the length of the band-shaped area 41 having a density of 70% in the perpendicular direction TY1. Based on the specified length, the controller 100 specifies an area in the capturing area SA, as the band-shaped area 41 having a density of 70% in the capturing area SA.

When the band-shaped area 41 having a density of 70%, the band-shaped area 41 having a density of 80%, and the band-shaped area 41 having a density of 90% are specified in the capturing area SA, the controller 100 acquires reflectance characteristic data representing a reflectance characteristic of the irradiation light with respect to the transport direction HY1, for each of the specified band-shaped areas 41. Here, the controller 100 calculates an average gradation value for each line area by averaging gradation values of pixels included in an area in the perpendicular direction TY1, sets a value representing a percentage of the average gradation value with respect to a white gradation value, as the reflectance, and acquires the reflectance characteristic data.

Figure 10B:
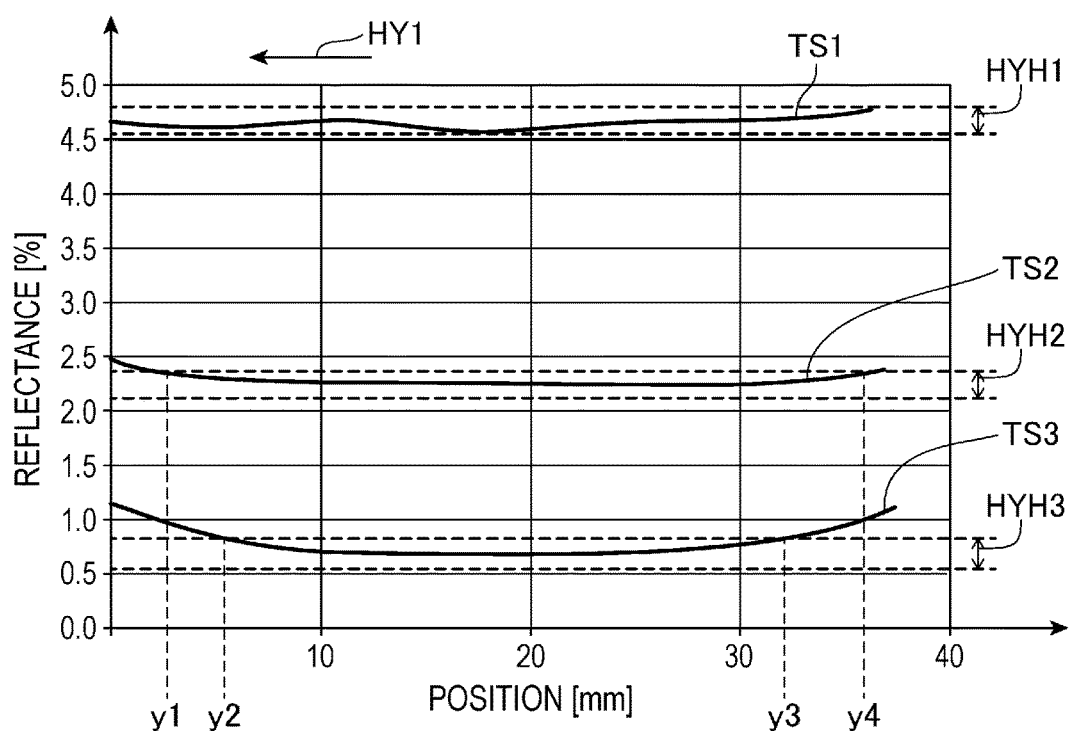
FIG. 10B is a graph illustrating an example of a reflectance characteristic in each band-shaped area.

FIG. 10B is a graph illustrating an example of a reflectance characteristic in each band-shaped area 41.

In FIG. 10B, a vertical axis represents reflectance of the irradiation light, the reflectance being expressed as a percentage of the average gradation value with respect to a white gradation value. In addition, in FIG. 10B, a horizontal axis represents a position of the band-shaped area 41 in the transport direction HY1, and a unit of the horizontal axis is millimeter (mm). In FIG. 10B, a position of a pixel positioned on the most upstream side of the band-shaped area 41 in the transport direction HY1 is set as the origin of the horizontal axis. In addition, in FIG. 10B, a direction toward the origin is a direction corresponding to the transport direction HY1.

A characteristic TS1 illustrated in FIG. 10B is a reflectance characteristic of the band-shaped area 41 having a density of 70% in the captured image G1 illustrated in FIG. 10A. In addition, a characteristic TS2 illustrated in FIG. 10B is a reflectance characteristic of the band-shaped area 41 having a density of 80% in the captured image G1 illustrated in FIG. 10A. In addition, a characteristic TS3 illustrated in FIG. 10B is a reflectance characteristic of the band-shaped area 41 having a density of 90% in the captured image G1 illustrated in FIG. 10A.

As illustrated in FIG. 10B, in each reflectance characteristic, the reflectance decreases in order of the characteristics TS1, TS2, and TS3. This is because the characteristic TS1 illustrates the reflectance characteristic of the band-shaped area 41 having a density of 70%, the characteristic TS2 illustrates the reflectance characteristic of the band-shaped area 41 having a density of 80%, and the characteristic TS3 illustrates the reflectance characteristic of the band-shaped area 41 having a density of 90%. As illustrated in FIG. 10B, as compared with the characteristic TS1 and the characteristic TS2, the characteristic TS3 is a most-remarkable-U-shaped reflectance characteristic in which the reflectance decreases as the position is closer to the center of the captured image G1 in the transport direction HY1. That is, the characteristic TS3 represents that a change in the reflectance due to brightness unevenness in the band-shaped area 41 is the largest in the band-shaped area 41 having a density of 90% among the three band-shaped areas 41.

Returning to the explanation of the flowchart of FIG. 8, when the reflectance characteristic data for each of the band-shaped areas 41 included in the distribution measurement pattern 40 is acquired, the controller 100 determines (specifies) an effective initial-and-final-image-data range (a specific initial-and-final-image-data range, a specific range, an effective range) based on the acquired reflectance characteristic data, and stores information representing the determined (specified) effective initial-and-final-image-data range in the storage 101 or the like (step SB6). The effective initial-and-final-image-data range represents an effective range of the captured image data of the capturing area SA that is obtained by initial capturing and final capturing of the test pattern 50 and is used in the correction value acquisition processing.

Here, step SB6 will be described in detail with reference to FIG. 10B.

First, when acquiring the effective initial-and-final-image-data range, the controller 100 determines whether or not each reflectance characteristic represented by the reflectance characteristic data acquired in step SB5 is within an effective reflectance range (a specific reflectance range, a predetermined range). The effective reflectance range is a range of reflectance corresponding to a density, and is a range of reflectance that can be used when calculating a density unevenness correction value, for example, when calculating a density unevenness correction value without causing an excessive correction. The excessive correction represents, for example, a correction in which a black streak is generated because the dot generation rate is too high even though the dot generation rate is increased in order to suppress a white streak. The effective reflectance range is calculated for each density of the band-shaped areas 41 by a pre-test, a simulation, or the like, and is stored in advance in the storage 101 or the like as information.

For example, in a case of FIG. 10B, the controller 100 acquires information representing an effective reflectance range HYH1 corresponding to a density of 70% from the storage 101, and determines whether or not the reflectance represented by the characteristic TS1 is within the effective reflectance range HYH1. Similarly, in the case of FIG. 10B, the controller 100 acquires information representing an effective reflectance range HYH2 corresponding to a density of 80% from the storage 101, and determines whether or not the reflectance represented by the characteristic TS2 is within the effective reflectance range HYH2. Similarly, in the case of FIG. 10B, the controller 100 acquires information representing an effective reflectance range HYH3 corresponding to a density of 90% from the storage 101, and determines whether or not the reflectance represented by the characteristic TS3 is within the effective reflectance range HYH3.

As illustrated in FIG. 10B, the reflectance of the characteristic TS1 is within the effective reflectance range HYH1, and thus the controller 100 determines that the reflectance represented by the characteristic TS1 is within the effective reflectance range HYH1. In addition, as illustrated in FIG. 10B, the characteristic TS2 is a reflectance characteristic in which the reflectance is outside the effective reflectance range HYH2 in a range from the origin to a position y1 in the horizontal axis and in a range of a position y4 or above in the horizontal axis. Therefore, the controller 100 determines that the reflectance represented by the characteristic TS2 is not within the effective reflectance range HYH2. In addition, as illustrated in FIG. 10B, the characteristic TS3 is a reflectance characteristic in which the reflectance is outside the effective reflectance range HYH3 in a range from the origin to a position y2 in the horizontal axis and in a range of a position y3 or above in the horizontal axis. Therefore, the controller 100 determines that the reflectance represented by the characteristic TS3 is not within the effective reflectance range HYH3.

Next, the controller 100 determines (specifies) a range in which the reflectance represented by the reflectance characteristic is within the effective reflectance range, based on the reflectance characteristic including the reflectance determined as not being within the effective reflectance range. In the case of FIG. 10B, the characteristic TS2 and the characteristic TS3 correspond to the reflectance characteristic including the reflectance determined by the controller 100 as not being within the effective reflectance range. Therefore, the controller 100 specifies a range in which the reflectance represented by the characteristic TS2 is within the effective reflectance range HYH2, that is, a range from the position y1 in the horizontal axis to the position y4 in the horizontal axis. In addition, the controller 100 specifies a range in which the reflectance represented by the characteristic TS3 is within the effective reflectance range HYH3, that is, a range from the position y2 in the horizontal axis to the position y3 in the horizontal axis.

Next, in a case where there are a plurality of ranges each in which the reflectance represented by the reflectance characteristic is within the effective reflectance range, the reflectance characteristic including the reflectance determined as not being within the effective reflectance range, the controller 100 determines (specifies) the narrowest range as the effective initial-and-final-image-data range. In the case of FIG. 10B, since the range from the position y2 in the horizontal axis to the position y3 in the horizontal axis that is specified by the characteristic TS3 is narrower than the range from the position y1 in the horizontal axis to the position y4 in the horizontal axis that is specified by the characteristic TS2, the controller 100 specifies the range from the position y2 in the horizontal axis to the position y3 in the horizontal axis, as the effective initial-and-final-image-data range. As is clear from FIG. 10B, the effective initial-and-final-image-data range is a range in which the reflectance represented by the characteristic TS3 is within the effective reflectance range HYH3 and which is a maximum range in the transport direction HY1.

When the range from the position y2 in the horizontal axis to the position y3 in the horizontal axis is specified as the effective initial-and-final-image-data range, the controller 100 stores information representing the specified effective initial-and-final-image-data range in the storage 101 or the like.

Returning to the explanation of the flowchart illustrated in FIG. 8, when determining (specifying) and storing the effective initial-and-final-image-data range, the controller 100 determines whether or not the effective initial-and-final-image-data range is determined (specified) based on the captured image data of all of the distribution measurement pattern 40 (step SB7).

In a case where it is determined that the effective initial-and-final-image-data range is not specified based on the captured image data of all of the distribution measurement pattern 40 (NO in step SB7), the controller 100 returns to the processing of step SB5, and specifies the effective initial-and-final-image-data range based on the captured image data of the distribution measurement pattern 40 for which the effective initial-and-final-image-data range is not specified.

On the other hand, in a case where it is determined that the effective initial-and-final-image-data range is specified based on the captured image data of all of the distribution measurement pattern 40 (YES in step SB7), the controller 100 causes the transport mechanism 106 to transport the print medium 3 by a predetermined amount in the transport direction HY1 (step SB8).

Next, the controller 100 causes the printer 105 to print the test pattern 50 on the print surface 3a of the print medium 3 based on the test pattern data 101a stored in the storage 101 (step SB9).

Figure 11:
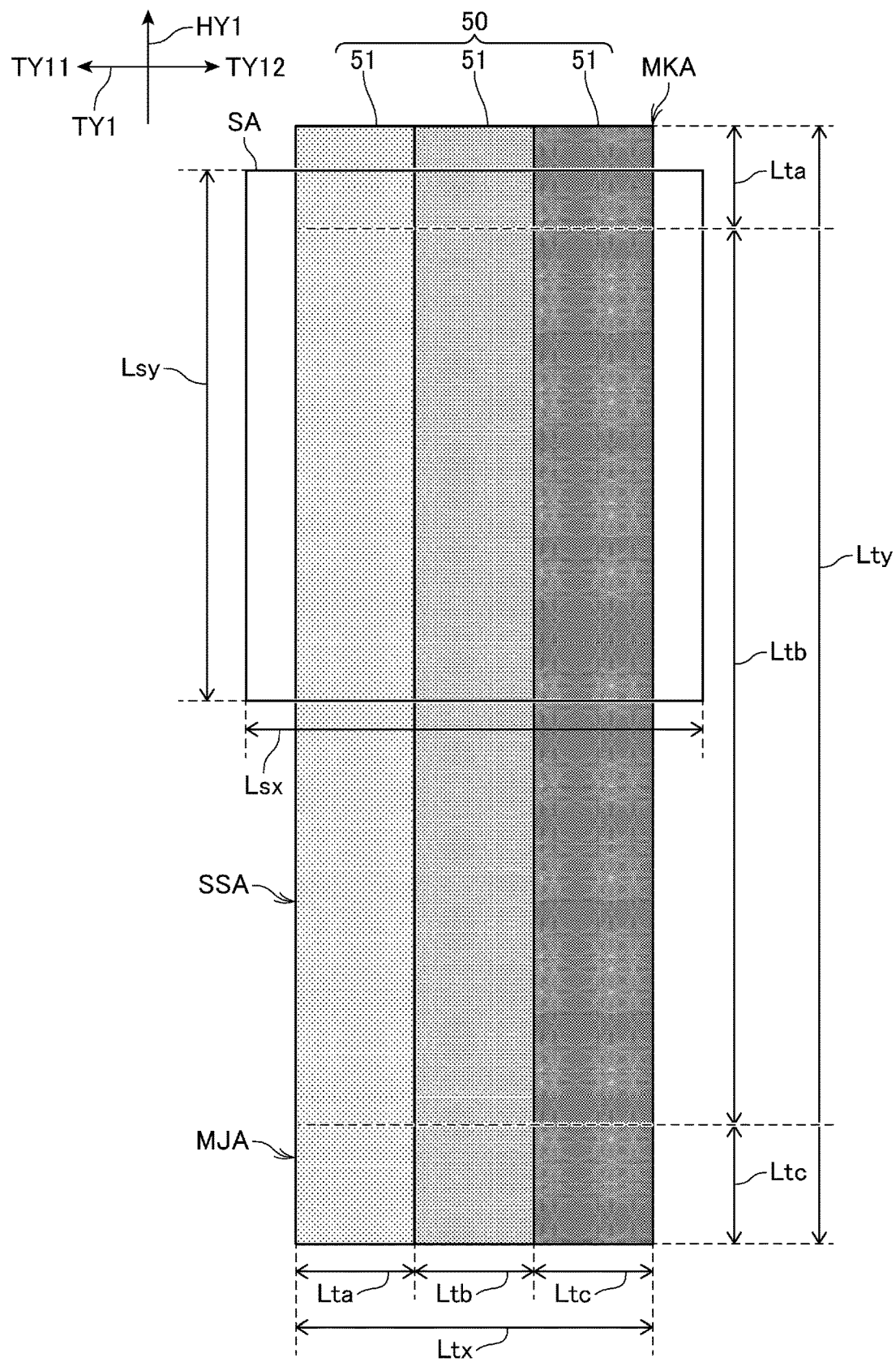
FIG. 11 is a diagram illustrating an example of a test pattern.

FIG. 11 is a diagram illustrating an example of the test pattern 50.

As illustrated in FIG. 11, the test pattern 50 is a pattern image in which a plurality of band-shaped areas 51 elongated in the transport direction HY1 are disposed side by side in the perpendicular direction TY1. The controller 100 causes the printer 105 to print the test pattern 50 such that densities in one band-shaped area 51 become the same density and the adjacent band-shaped areas 51 have different densities from each other. For example, the test pattern 50 illustrated in FIG. 11 includes three band-shaped areas 51 having densities of 70%, 80%, and 90% in order from the direction TY11 (that is, the full side) along the perpendicular direction TY1.

Similar to the distribution measurement pattern 40, the test pattern 50 is formed for each color ink. In FIG. 11, although an example in which three band-shaped areas 51 are provided in one test pattern 50 is illustrated, more or fewer band-shaped areas 51 having different densities may be provided. In addition, in a case where the band-shaped areas 51 do not fit into one test pattern 50, a plurality of test patterns 50 may be provided. For example, a test pattern 50 including three band-shaped areas 51 having densities of 10%, 20%, and 30% and a test pattern 50 including three band-shaped areas 51 having densities of 70%, 80%, and 90% may be provided, respectively.

A length of the test pattern 50 in the perpendicular direction TY1 has a dimension Ltx. The dimension Ltx is determined by a dimension Lta representing a length of the band-shaped area 51 having a density of 70% in the perpendicular direction TY1, a dimension Ltb representing a length of the band-shaped area 51 having a density of 80% in the perpendicular direction TY1, and a dimension Ltc representing a length of the band-shaped area 51 having a density of 90% in the perpendicular direction TY1. Preferably, the dimension Ltx is shorter than a dimension Lsx representing a length of the capturing area SA of the camera 72 in the perpendicular direction TY1. When the dimension Ltx is longer than the dimension Lsx, it is difficult to reduce a predetermined noise included in reflectance characteristic data acquired from each of the band-shaped areas 51, or it is difficult to reliably acquire the reflectance characteristic data from each of the three band-shaped areas 51.

In addition, a length of the test pattern 50 in the transport direction HY1 has a dimension Lty. As illustrated in FIG. 11, in the transport direction HY1, the test pattern 50 includes a calculation area SSA used in the correction value acquisition processing, a margin area MJA printed as an extra portion of the calculation area SSA on the upstream side in the transport direction HY1, and a margin area MKA printed as an extra portion of the calculation area SSA on the downstream side in the transport direction HY1. Therefore, the dimension Lty representing the length of the test pattern 50 in the transport direction HY1 is determined by a dimension Lta representing a length of the margin area MKA in the transport direction HY1, a dimension Ltb representing a length of the calculation area SSA in the transport direction HY1, and a dimension Ltc representing a length of the margin area MJA in the transport direction HY1.

The dimension Ltb is determined by "dimension Ltb=head length/number of paths" based on the head length and the number of paths. As described above, in the present embodiment, the head length is a separation distance from the nozzle 81 positioned on the most upstream side to the nozzle 81 positioned on the most downstream side among the plurality of nozzles 81 disposed side by side in the transport direction HY1. That is, the dimension Ltb has the same value as the transport amount F. For example, in a case where the head length is 5 inches and the number of paths is two, the dimension Ltb representing the length of the calculation area SSA in the transport direction HY1 is 2.5 inches.

In a case where a position of an end portion of the effective initial-and-final-image-data range specified in step SB6 on the downstream side in the transport direction HY1 is aligned with a position of an end portion of the calculation area SSA on the downstream side in the transport direction HY1, the dimension Lta is set to a length such that an area of the capturing area SA in the transport direction HY1 is filled with the test pattern 50. Similarly, in a case where a position of an end portion of the effective initial-and-final-image-data range specified in step SB6 on the upstream side in the transport direction HY1 is aligned with a position of an end portion of the calculation area SSA on the downstream side in the transport direction HY1, the dimension Ltb is set to a length such that an area of the capturing area SA in the transport direction HY1 is filled with the test pattern 50. The dimension Lta and the dimension Ltc are set by a pre-test, a simulation, or the like.

Returning to the explanation of the flowchart illustrated in FIG. 8, when the test patterns 50 are printed, the controller 100 executes initial capturing processing for one test pattern 50 among the printed test patterns 50 (step SB10). The initial capturing processing is processing which is executed when initially capturing the test pattern 50.

Figure 12:
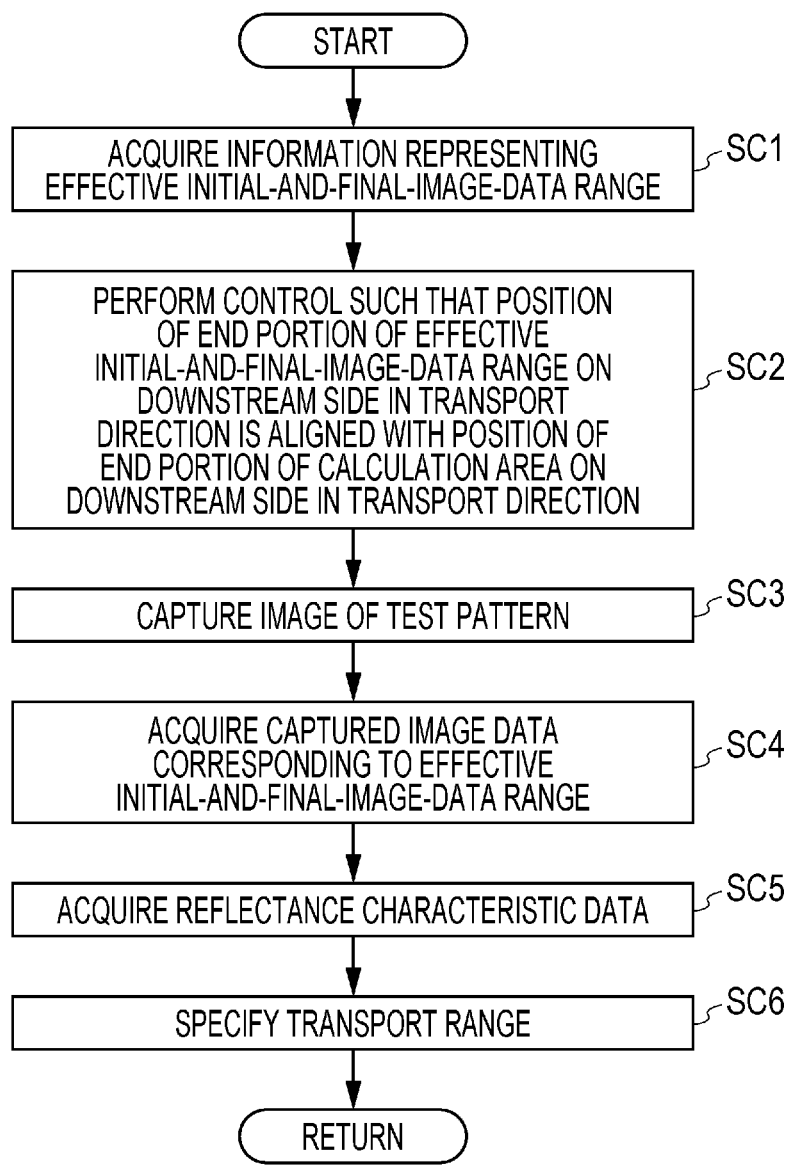
FIG. 12 is a flowchart illustrating an operation of the printing apparatus in initial capturing processing.

FIG. 12 is a flowchart illustrating an operation of the printing apparatus 1 in the initial capturing processing.

The controller 100 of the printing apparatus 1 acquires the information representing the effective initial-and-final-image-data range of the capturing area SA of the camera 72, from the storage 101 (step SC1).

Next, the controller 100 controls the carriage drive motor and the transport roller based on the information representing the effective initial-and-final-image-data range acquired in step SC1 such that the position of the end portion of the effective initial-and-final-image-data range on the downstream side in the transport direction HY1 is aligned with the position of the end portion of the calculation area SSA on the downstream side in the transport direction HY1 (step SC2).

Figure 13A:
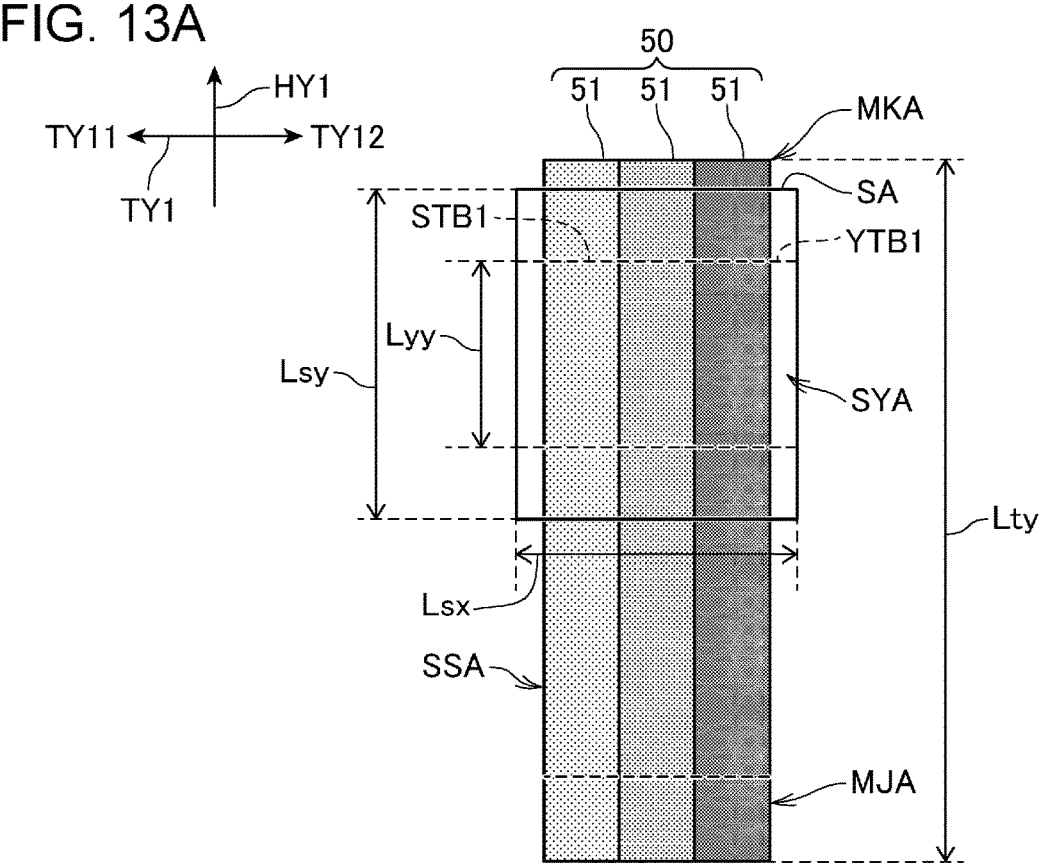
FIG. 13A is a diagram for explaining a position of an effective initial-and-final-image-data range.

FIG. 13A is a diagram for explaining a position of the effective initial-and-final-image-data range SYA.

The effective initial-and-final-image-data range SYA illustrated in FIG. 13A is a rectangular area in which a length in the transport direction HY1 has a dimension Lyy and a length in the perpendicular direction TY1 has a dimension Lsx.

As illustrated in FIG. 13A, the controller 100 performs a control such that a position of an end portion STB1 of the calculation area SSA of the test pattern 50 to be captured is aligned with a position of an end portion YTB1 of the effective initial-and-final-image-data range SYA of the capturing area SA. The end portion STB1 is an end portion of the calculation area SSA on the downstream side in the transport direction HY1. The end portion YTB1 is an end portion of the effective initial-and-final-image-data range SYA on the downstream side in the transport direction HY1.

The controller 100 performs a control such that the position of the end portion STB1 is aligned with the position of the end portion YTB1, based on the position at which the test pattern 50 to be captured is printed on the print surface 3a, the dimension Lty representing the length of the test pattern 50 in the transport direction HY1, the dimension Ltb representing the length of the calculation area SSA in the transport direction HY1, the dimension Lsy representing the length of the capturing area SA in the transport direction HY1, and the dimension Lyy representing the length of the effective initial-and-final-image-data range SYA in the transport direction HY1.

As described above, in a case where the position of the end portion YTB1 of the effective initial-and-final-image-data range SYA is aligned with the position of the end portion STB1 of the calculation area SSA, a length of the margin area MKA is set such that the area of the capturing area SA in the transport direction HY1 is filled with the test pattern 50. Therefore, as illustrated in FIG. 13A, even in a case where the position of the end portion YTB1 and the position of the end portion STB1 are aligned with each other, the area of the capturing area SA in the transport direction HY1 is filled with the test pattern 50.

Returning to the explanation of the flowchart illustrated in FIG. 12, the controller 100 causes the camera 72 to capture an image of the test pattern 50 when the position of the end portion of the effective initial-and-final-image-data range SYA on the downstream side in the transport direction HY1 is aligned with the position of the end portion of the calculation area SSA on the downstream side in the transport direction HY1 (step SC3).

Next, the controller 100 acquires captured image data corresponding to the effective initial-and-final-image-data range SYA, from captured image data representing the captured image of the test pattern 50 (step SC4). In a case of FIG. 13A, the controller 100 acquires captured image data of a region from the position of the end portion STB1 of the calculation area SSA to a position away from the position of the end portion STB1 by the dimension Lyy on the upstream side in the transport direction HY1, as captured image data corresponding to the effective initial-and-final-image-data range SYA.

In this manner, in the initial capturing of the test pattern 50, the controller 100 performs a control such that the position of the end portion STB1 of the calculation area SSA in the transport direction HY1 is aligned with the position of the end portion YTB1 of the effective initial-and-final-image-data range SYA. The controller 100 acquires the captured image data corresponding to the effective initial-and-final-image-data range SYA among the captured image data representing the captured image of the capturing area SA. As described above, the effective initial-and-final-image-data range SYA is a range in which the reflectance of the captured image data is within the effective reflectance range. Therefore, when calculating the density unevenness correction value, the controller 100 can acquire the captured image data by which an appropriate correction value for a portion around the end portion STB1 of the calculation area SSA can be calculated regardless of brightness unevenness. That is, the controller 100 can acquire the captured image data by which brightness unevenness in the portion around the end portion STB1 of the calculation area SSA can be reduced, the brightness unevenness being caused by the type of the print medium 3, the type of the ink ejected on the print medium 3, or the like.

Next, the controller 100 acquires the reflectance characteristic data for each of the band-shaped areas 51 of the test pattern 50 based on the captured image data representing the captured image of the test pattern 50 by executing the processing described in step SB5 for each test pattern 50 (step SC5). The captured image data which is used in step SC5 is captured image data corresponding to the capturing area SA, and is not captured image data corresponding to the effective initial-and-final-image-data range SYA.

When the reflectance characteristic data for each of the band-shaped areas 51 of the test pattern 50 in the capturing area SA is acquired, based on the acquired reflectance characteristic data, the controller 100 determines (specifies) a transport range for transporting the print medium 3 in the transport direction HY1 when next capturing is performed by the camera 72 (step SC6). The specified transport range is stored in the storage 101 as information.

Here, step SC6 will be described in detail.

Figure 13B:
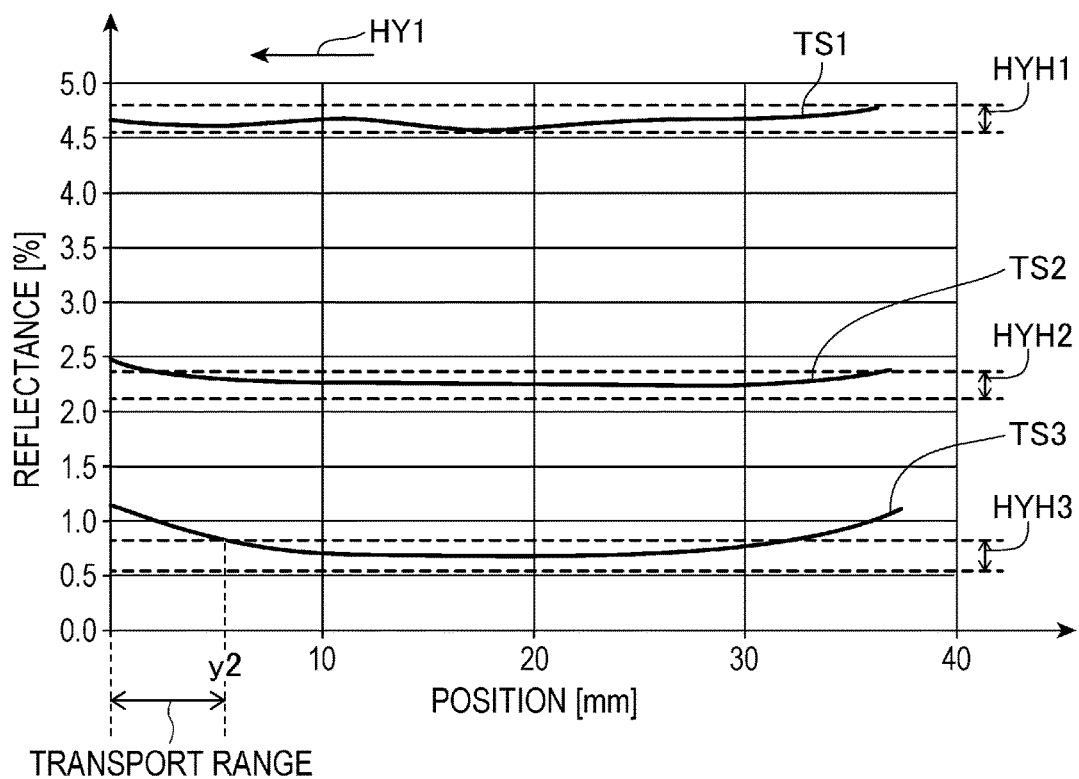
FIG. 13B is a graph illustrating an example of a reflectance characteristic in each band-shaped area.

FIG. 13B is a graph illustrating an example of a reflectance characteristic in each band-shaped area 51.

Each characteristic illustrated in FIG. 13B is the same as each characteristic illustrated in FIG. 10B, and thus a detailed description will be omitted. In addition, each axis illustrated in FIG. 13B is the same as each axis illustrated in FIG. 10B, and thus a detailed description thereof will be omitted.

As described above, the narrowest effective reflectance range is determined as the effective initial-and-final-image-data range SYA. Therefore, in a case of FIG. 13B, the effective initial-and-final-image-data range SYA is a range from a position y2 in the horizontal axis to a position y3 in the horizontal axis. The controller 100 sets a range from a position of an end portion of the capturing area SA on the downstream side in the transport direction HY1 to a position of an end portion YTB1 of the effective initial-and-final-image-data range SYA, as the transport range specified in step SC6. In a case of FIG. 13B, a position of an end portion of the capturing area SA on the upstream side in the transport direction HY1 is the origin, and a position of the end portion YTB1 of the effective initial-and-final-image-data range SYA is a position y2 in the horizontal axis, and thus the controller 100 specifies a range from the origin to the position y2 in the horizontal axis, as the transport range.

Returning to the explanation of the flowchart illustrated in FIG. 8, when the initial capturing processing is executed, the controller 100 determines whether or not the entire area of the calculation area SSA of the test pattern 50 is captured in the initial capturing (step SB11). In step SC2 of the initial capturing processing, in a case where it is determined that the position of the end portion of the calculation area SSA on the upstream side in the transport direction HY1 is positioned on the downstream side in the transport direction HY1 than the position of the end portion of the effective initial-and-final-image-data range SYA on the upstream side in the transport direction HY1 is positioned, the controller 100 determines that the entire area of the calculation area SSA of the test pattern 50 is captured in the initial capturing (YES in step SB11). On the other hand, in step SC2 of the initial capturing processing, in a case where it is determined that the position of the end portion of the calculation area SSA on the upstream side in the transport direction HY1 is positioned on the upstream side in the transport direction HY1 than the position of the end portion of the effective initial-and-final-image-data range SYA on the upstream side in the transport direction HY1 is positioned, the controller 100 determines that the entire area of the calculation area SSA of the test pattern 50 is not captured in the initial capturing (NO in step SB11).

In a case where it is determined that the entire area of the calculation area SSA of the test pattern 50 is captured in the initial capturing (YES in step SB11), the controller 100 proceeds to processing of step SB15, and acquires captured image data acquired in the initial capturing processing, as synthesized captured-image data to be described (step SB15).

On the other hand, in a case where it is determined that the entire area of the calculation area SSA of the test pattern 50 is not captured in the initial capturing (NO in step SB11), the controller 100 determines whether or not the entire area of the calculation area SSA of the test pattern 50 can be captured in the next capturing (step SB12).

When the print medium 3 is transported in the transport direction HY1 by the transport range specified in step SC6 of the initial capturing processing, in a case where it is determined that the end portion of the effective initial-and-final-image-data range SYA of the capturing area SA on the upstream side in the transport direction HY1 is positioned on the upstream side in the transport direction HY1 than the end portion of the calculation area SSA on the upstream side in the transport direction HY1 is positioned, the controller 100 determines that the entire area of the calculation area SSA of the test pattern 50 can be captured in the next capturing (YES in step SB12). On the other hand, when the print medium 3 is transported in the transport direction HY1 by the transport range specified in step SC6 of the initial capturing processing, in a case where it is determined that the end portion of the effective initial-and-final-image-data range of the capturing area SA on the upstream side in the transport direction HY1 is positioned on the downstream side in the transport direction HY1 than the end portion of the calculation area SSA on the upstream side in the transport direction HY1 is positioned, the controller 100 determines that the entire area of the calculation area SSA of the test pattern 50 cannot be captured in the next capturing (NO in step SB12).

In a case where it is determined that the entire area of the calculation area SSA of the test pattern 50 cannot be captured in the next capturing (NO in step SB12), the controller 100 executes continuous capturing processing (step SB13). On the other hand, in a case where it is determined that the entire area of the calculation area SSA of the test pattern 50 can be captured in the next capturing (YES in step SB12), the controller 100 executes final capturing processing (step SB14).

First, continuous capturing processing will be described.

Figure 14:
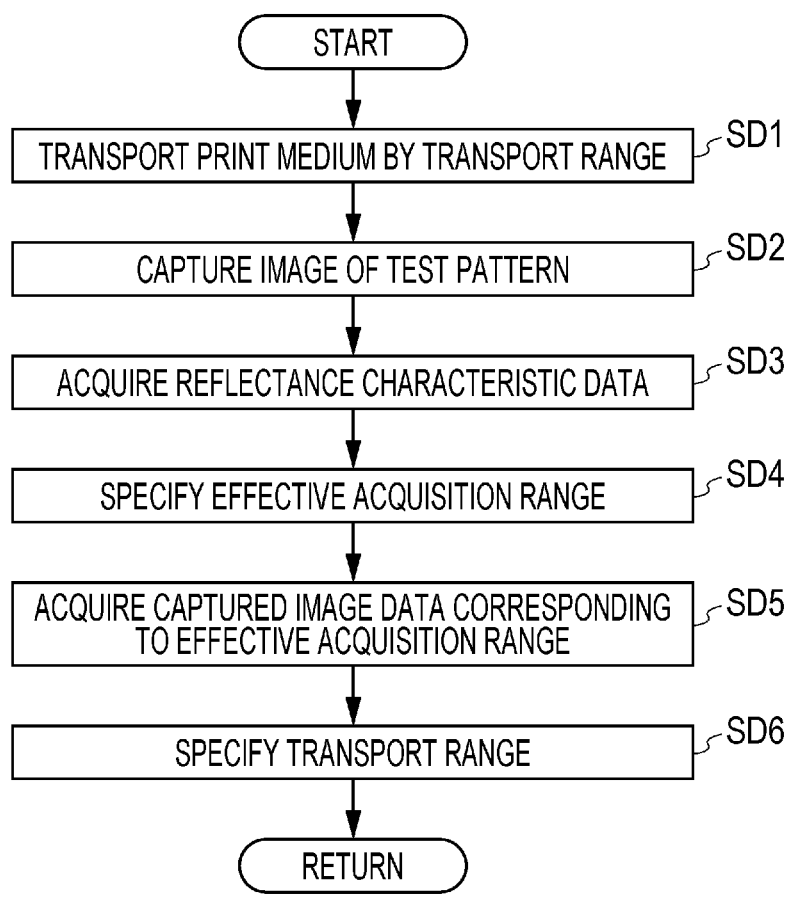
FIG. 14 is a flowchart illustrating an operation of the printing apparatus in continuous capturing processing.

FIG. 14 is a flowchart illustrating an operation of the printing apparatus 1 in continuous capturing processing.

First, the controller 100 transports the print medium 3 in the transport direction HY1 by the transport range (step SD1), based on the information representing the transport range stored in the storage 101. In a case where step SD1 is executed after the initial capturing processing without executing the continuous capturing processing even once, the controller 100 transports the print medium 3 in the transport direction HY1 by the transport range determined (specified) in the initial capturing processing. As will be seen later, in a case where step SD1 is executed after executing the continuous capturing processing, the controller 100 transports the print medium 3 in the transport direction HY1 by the transport range determined (specified) in the continuous capturing processing.

Figure 15A:
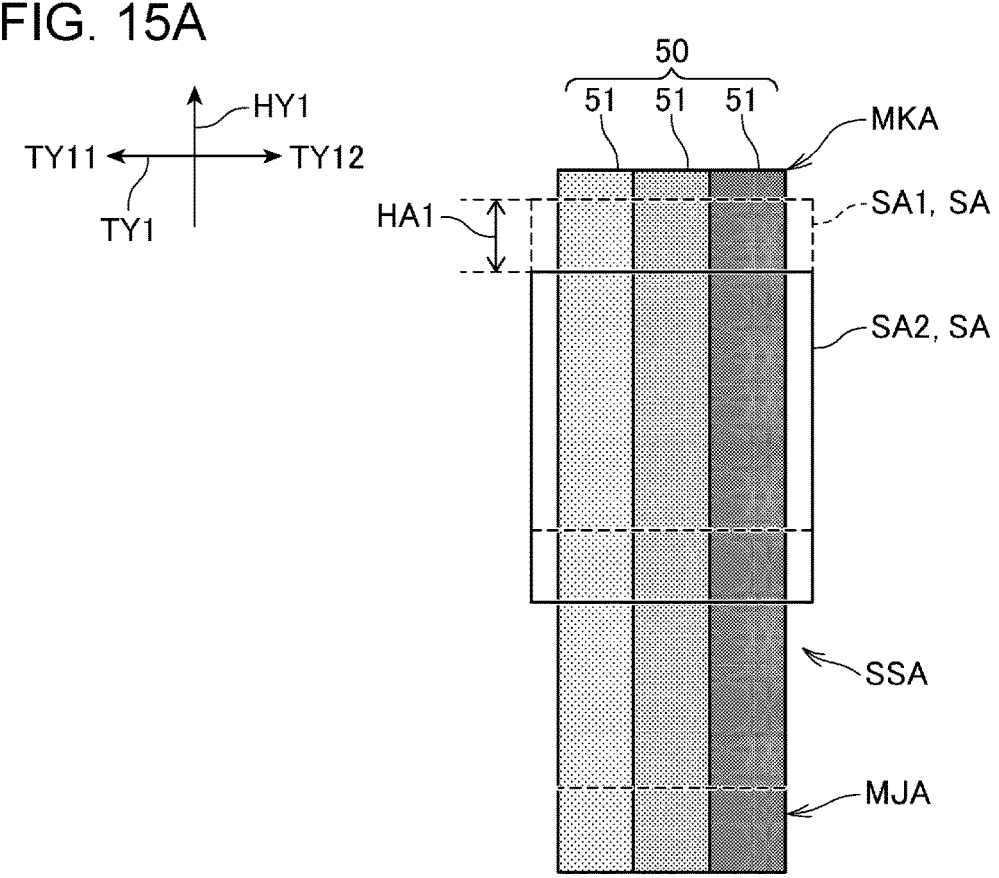
FIG. 15A is a diagram illustrating an example of a position of a capturing area after transporting of a print medium.

FIG. 15A is a diagram illustrating an example of a position of the capturing area SA after transporting of the print medium.

FIG. 15A illustrates a position of the capturing area SA in a case where the print medium 3 is transported in the transport direction HY1 by the transport range specified in the initial capturing processing.

In FIG. 15A, a capturing area SA1 represents a capturing area SA captured in the initial capturing processing. In addition, in FIG. 15A, a capturing area SA2 represents a capturing area SA in a case where the print medium 3 is transported in the transport direction HY1 by a transport range HA1 specified in the initial capturing processing.

As illustrated in FIG. 15A, the print medium 3 is transported in the transport direction HY1 by the transport range HA1, and thus, as illustrated in the capturing area SA2, the capturing area SA is positioned on the upstream side in the transport direction HY1 than the capturing area SA1 of the test pattern 50 is positioned.

Returning to the explanation of the flowchart illustrated in FIG. 14, when the print medium 3 is transported in the transport direction HY1 by the transport range in step SD1, the controller 100 causes the camera 72 to capture an image of the test pattern 50 (step SD2). For example, in the processing of step SD2, in a case where the capturing area SA is the capturing area SA2 illustrated in FIG. 15A, the controller 100 causes the camera 72 to capture an image of the capturing area SA2 of the test pattern 50.

Next, when the capturing is executed by the camera 72 in step SD2, the controller 100 acquires the reflectance characteristic data for each of the band-shaped areas 51 of the test pattern 50 based on the captured image data representing the captured image of the test pattern 50 by executing the processing described in step SB5 (step SD3).

In step SD3, the controller 100 acquires the reflection characteristic data for each of the band-shaped areas 51 of the test pattern 50 as described above. On the other hand, in the present embodiment, the controller 100 acquires the reflection characteristic data in the band-shaped area 51 of the test pattern 50, based on the band-shaped area 51 from which the reflectance characteristic data that is used when specifying the transport range in the initial capturing processing is acquired. For example, in the initial capturing processing, in a case where the transport range HA1 is specified using the reflectance characteristic data of the band-shaped area 51 having a density of 90%, in step SD3, the controller 100 acquires the reflection characteristic data of only the band-shaped area 51 having a density of 90%. The reason is as follows. Among the three band-shaped areas 51, the band-shaped area 51 having a density of 90% has the largest change in the reflectance due to brightness unevenness, and thus, in the continuous capturing processing, the transport range is specified based on the reflectance characteristic data of the band-shaped area 51 having a density of 90%. As described above, in the continuous capturing processing, the controller 100 does not acquire the reflectance characteristic data for each of the three band-shaped areas 51, and acquires the reflectance characteristic data for only the band-shaped area 51 from which the reflectance characteristic data that is used when specifying the transport range in the initial capturing processing is acquired. Thereby, the controller 100 can increase a processing speed of the continuous capturing processing.

Next, when the reflectance characteristic data for the band-shaped area 51 of the test pattern 50 is acquired, the controller 100 determines (specifies) an effective acquisition range (a specific acquisition range, a specific range, an effective range) (step SD4). The effective acquisition range represents an effective range of the captured image data of the capturing area SA that is obtained by the continuous capturing processing and is used in the correction value acquisition processing.

Here, step SD4 will be described in detail with reference to FIG. 15B.

Figure 15B:
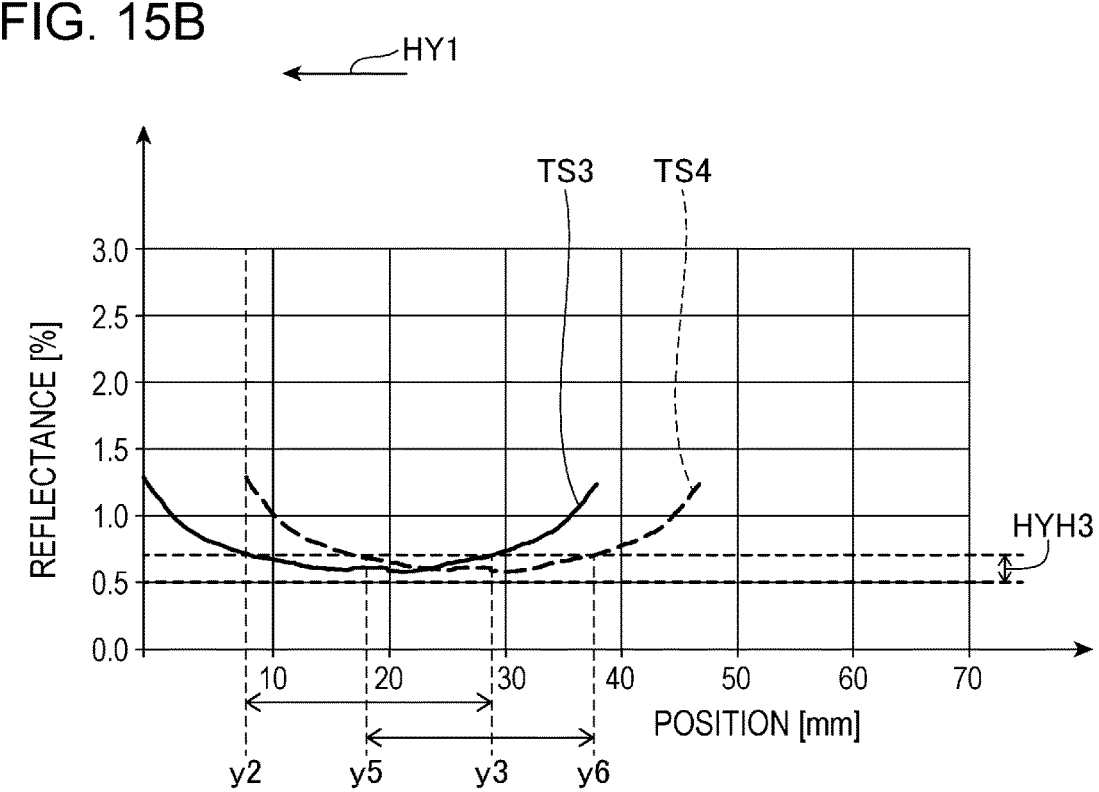
FIG. 15B is a graph illustrating an example of a reflectance characteristic in each band-shaped area.

FIG. 15B is a graph illustrating an example of a reflectance characteristic in the band-shaped area 51.

In FIG. 15B, a vertical axis represents reflectance of the irradiation light, the reflectance being expressed as a percentage of the average gradation value with respect to a white gradation value. In addition, in FIG. 15B, a horizontal axis represents a position of the band-shaped area 41 in the transport direction HY1, and a unit of the horizontal axis is millimeter (mm). In FIG. 15B, a position of a pixel positioned on the most downstream side of the calculation area SSA of the band-shaped area 51 in the transport direction HY1 is set as the origin of the horizontal axis. In addition, in FIG. 15B, a direction toward the origin is a direction corresponding to the transport direction HY1.

A characteristic TS3 illustrated in FIG. 15B is the same as the characteristic TS3 illustrated in FIG. 13B, and is a reflectance characteristic of the band-shaped area 51 having a density of 90% in the capturing area SA1 illustrated in FIG. 15A. In addition, a characteristic TS4 illustrated in FIG. 15B is a reflectance characteristic of the band-shaped area 51 having a density of 90% in the capturing area SA2 illustrated in FIG. 15A.

As illustrated in FIG. 15B, similarly to the characteristic TS3, the characteristic TS4 is a U-shaped reflectance characteristic in which the reflectance decreases as the position is closer to the center of the capturing area in the transport direction HY1.

In addition, as illustrated in FIG. 15B, the characteristic TS4 is a reflectance characteristic starting from a position y2 in the horizontal axis. This is because the capturing area SA2 is the capturing area SA in a case where the print medium 3 is transported in the transport direction HY1 by the transport range HA1.

First, when acquiring the effective acquisition range, the controller 100 specifies a range in which the reflectance characteristic represented by the reflectance characteristic data acquired in step SD3 is within the effective reflectance range, as the effective acquisition range. In a case of FIG. 15B, the controller 100 specifies a range in which the reflectance represented by the characteristic TS4 is within the effective reflectance range HYH3, that is, a range from a position y5 in the horizontal axis to a position y6 in the horizontal axis, as the effective acquisition range. As is clear from FIG. 15B, the effective acquisition range is a range in which the reflectance represented by the characteristic TS4 is within the effective reflectance range HYH3 and which is a maximum range in the transport direction HY1 (a maximum range in a direction corresponding to the transport direction HY1). In FIG. 15B, a range from a position y2 in the horizontal axis to a position y3 in the horizontal axis is the effective initial-and-final-image-data range.

Returning to the explanation of the flowchart illustrated in FIG. 14, when the effective acquisition range is specified, the controller 100 acquires the captured image data corresponding to the effective acquisition range (step SD5). In a case of FIGS. 15A and 15B, the controller 100 sets a range of the capturing area SA2 in the transport direction HY1 from the position y5 in the horizontal axis to the position y6 in the horizontal axis, as the effective acquisition range, and acquires the captured image data corresponding to the effective acquisition range.

Next, when the captured image data corresponding to the effective acquisition range is acquired, based on the acquired reflectance characteristic data, the controller 100 specifies a transport range for transporting the print medium 3 in the transport direction HY1 when next capturing is performed by the camera 72 (step SD6). The specified transport range is stored in the storage 101 as information.

In step SD6, the controller 100 specifies a range from an end portion of the capturing area SA on the downstream side in the transport direction HY1 to an end portion of the effective acquisition range on the downstream side in the transport direction HY1, as the transport range. That is, in the case of FIG. 15B, the effective acquisition range is a range from the position y5 in the horizontal axis to the position y6 in the horizontal axis. Therefore, since the position of the end portion of the capturing area SA2 on the downstream side in the transport direction HY1 is the position y2 in the horizontal axis and the position of the end portion of the effective acquisition range on the downstream side in the transport direction HY1 is the position y5 in the horizontal axis, the controller 100 specifies the range from the position y2 in the horizontal axis to the position y5 in the horizontal axis, as the transport range.

Returning to the explanation of the flowchart illustrated in FIG. 8, when executing the continuous capturing processing, the controller 100 proceeds to step SB12. Then, in a case where it is determined that the entire area of the calculation area SSA of the test pattern 50 cannot be captured in the next capturing (NO in step SB12), the controller 100 executes the continuous capturing processing again (step SB13).

When executing the continuous capturing processing again, the controller 100 transports the print medium 3 in the transport direction HY1 by the transport range specified in the previous continuous capturing processing.

Figure 16A:
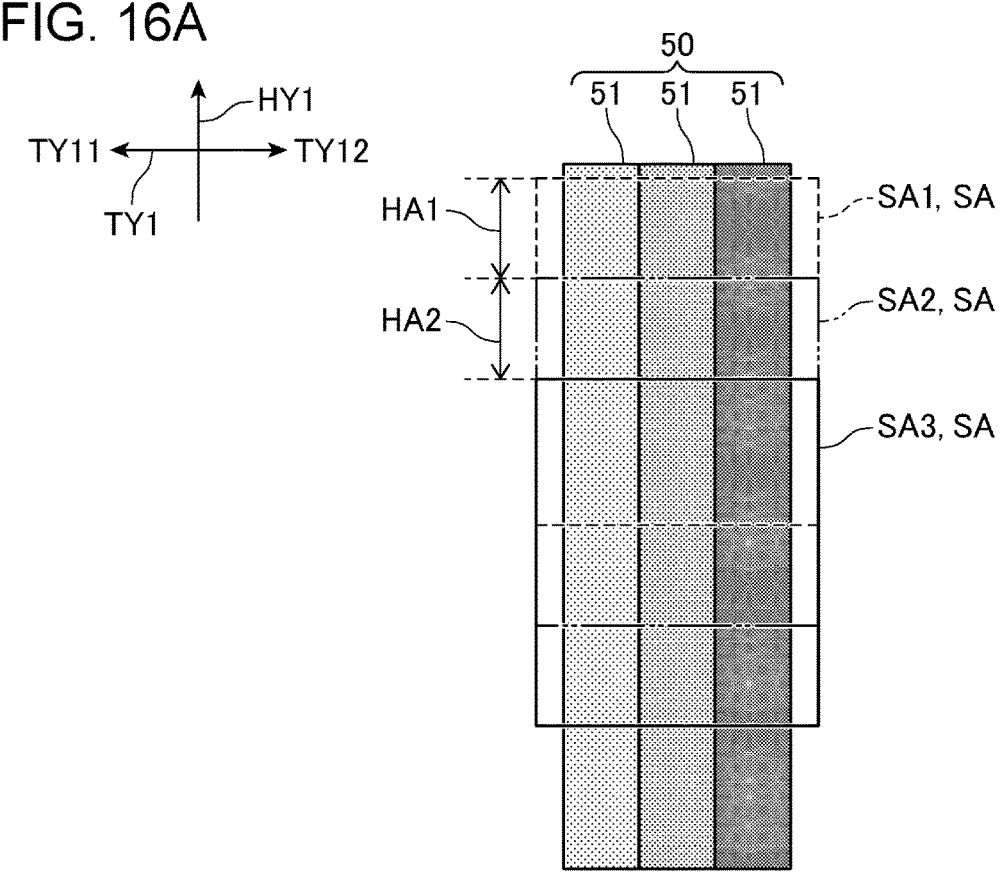
FIG. 16A is a diagram illustrating an example of a position of a capturing area after transporting of a print medium.

FIG. 16A is a diagram illustrating an example of a position of the capturing area SA when the continuous capturing processing is executed and then the print medium is transported by the transport range specified in the continuous capturing processing.

FIG. 16A illustrates a position of a capturing area SA3 in a case where the print medium 3 is transported in the transport direction HY1 by the transport range HA2 specified in the continuous capturing processing.

In FIG. 16A, a capturing area SA1 represents a capturing area SA captured in the initial capturing processing. In addition, in FIG. 16A, a capturing area SA2 represents a capturing area SA in a case where the print medium 3 is transported in the transport direction HY1 by a transport range HA1 specified in the initial capturing processing. In addition, in FIG. 16A, a capturing area SA3 represents a capturing area SA in a case where the print medium 3 is transported in the transport direction HY1 by a transport range HA2 specified in the continuous capturing processing based on the capturing area SA2.

As illustrated in FIG. 16A, the print medium 3 is transported in the transport direction HY1 by the transport range HA1, and thus, as illustrated in the capturing area SA2, the capturing area SA is positioned on the upstream side in the transport direction HY1 than the capturing area SA1 of the test pattern 50 is positioned. In addition, as illustrated in FIG. 16A, the print medium 3 is transported in the transport direction HY1 by the transport range HA2, and thus, as illustrated in the capturing area SA3, the capturing area SA is positioned on the upstream side in the transport direction HY1 than the capturing area SA2 of the test pattern 50 is positioned.

When the print medium 3 is transported by the transport range specified in the previous continuous capturing processing, the controller 100 acquires the reflectance characteristic data by capturing an image by the camera 72. Then, the controller 100 specifies an effective acquisition range, and acquires captured image data corresponding to the specified effective acquisition range. Further, the controller 100 specifies a transport range.

Figure 16B:
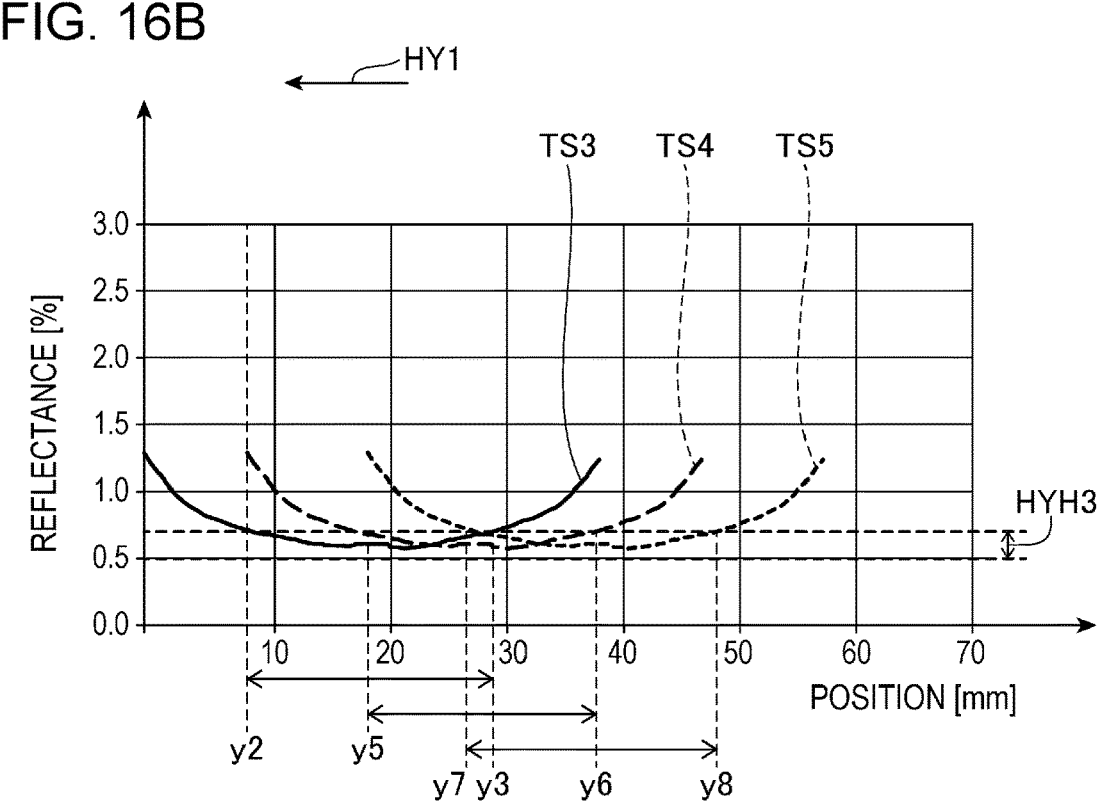
FIG. 16B is a graph illustrating an example of a reflectance characteristic in each band-shaped area.

FIG. 16B is a graph illustrating an example of a reflectance characteristic in the band-shaped area 51.

In FIG. 16B, a vertical axis represents reflectance of the irradiation light, the reflectance being expressed as a percentage of the average gradation value with respect to a white gradation value. In addition, in FIG. 16B, a horizontal axis represents a position of the band-shaped area 41 in the transport direction HY1, and a unit of the horizontal axis is millimeter (mm). In FIG. 16B, a position of a pixel positioned on the most upstream side of the calculation area SSA of the band-shaped area 51 in the transport direction HY1 is set as the origin of the horizontal axis. In FIG. 16B, in the horizontal axis, a direction toward the origin is the transport direction HY1.

A characteristic TS3 illustrated in FIG. 16B is the same as the characteristic TS3 illustrated in FIG. 13B and FIG. 15B, and is a reflectance characteristic of the band-shaped area 51 having a density of 90%. That is, the characteristic TS3 illustrated in FIG. 16B is a reflectance characteristic of the band-shaped area 51 having a density of 90% in the capturing area SA1 illustrated in FIG. 16A. A characteristic TS4 illustrated in FIG. 16B is a reflectance characteristic of the band-shaped area 51 having a density of 90% in the capturing area SA2 illustrated in FIG. 16A. In addition, a characteristic TS5 illustrated in FIG. 16B is a reflectance characteristic of the band-shaped area 51 having a density of 90% in the capturing area SA3 illustrated in FIG. 16A.

As illustrated in FIG. 16B, similarly to the characteristic TS3 and the characteristic TS4, the characteristic TS5 is a U-shaped reflectance characteristic in which the reflectance decreases as the position is closer to the center of the capturing area in the transport direction HY1.

In FIG. 16B, a range from the origin to a position y2 in the horizontal axis corresponds to a transport range HA1 illustrated in FIG. 16A. In addition, in FIG. 16B, a range from the position y2 in the horizontal axis to a position y5 in the horizontal axis corresponds to a transport range HA2 illustrated in FIG. 16A.

In addition, as illustrated in FIG. 16B, the characteristic TS5 is a reflectance characteristic starting from the position y5 in the horizontal axis. This is because the capturing area SA3 is the capturing area SA in a case where the print medium 3 is transported in the transport direction HY1 by the transport range HA2.

First, in a case of FIG. 16B, the controller 100 determines (specifies) a range in which the reflectance represented by the characteristic TS5 is within the effective reflectance range HYH3, that is, a range from a position y7 in the horizontal axis to a position y8 in the horizontal axis, as the effective acquisition range. In FIG. 16B, a range from the position y2 in the horizontal axis to a position y3 in the horizontal axis is the effective initial-and-final-image-data range. In addition, in FIG. 16B, a range from a position y5 in the horizontal axis to a position y6 in the horizontal axis is the effective acquisition range specified in the previous continuous capturing processing.

When the effective acquisition range is specified, the controller 100 acquires captured image data corresponding to the effective acquisition range of the capturing area SA3 in the transport direction HY1 from the position y5 in the horizontal axis to the position y6 in the horizontal axis. Then, the controller 100 determines (specifies) a range from an end portion of the capturing area SA3 on the downstream side in the transport direction HY1 to an end portion of the effective acquisition range on the downstream side in the transport direction HY1, as a transport range. That is, in the case of FIG. 16B, the effective acquisition range is a range from the position y7 in the horizontal axis to the position y8 in the horizontal axis. Therefore, since the position of the end portion of the capturing area SA3 on the downstream side in the transport direction HY1 is the position y5 in the horizontal axis and the position of the end portion of the effective acquisition range on the downstream side in the transport direction HY1 is the position y7 in the horizontal axis, the controller 100 specifies the range from the position y5 in the horizontal axis to the position y7 in the horizontal axis, as the transport range.

Returning to the explanation of step SB12 in the flowchart illustrated in FIG. 8, as described above, in a case where it is determined that the entire area of the calculation area SSA of the test pattern 50 can be captured in the next capturing (YES in step SB12), the controller 100 executes final capturing processing (step SB14).

Figure 17:
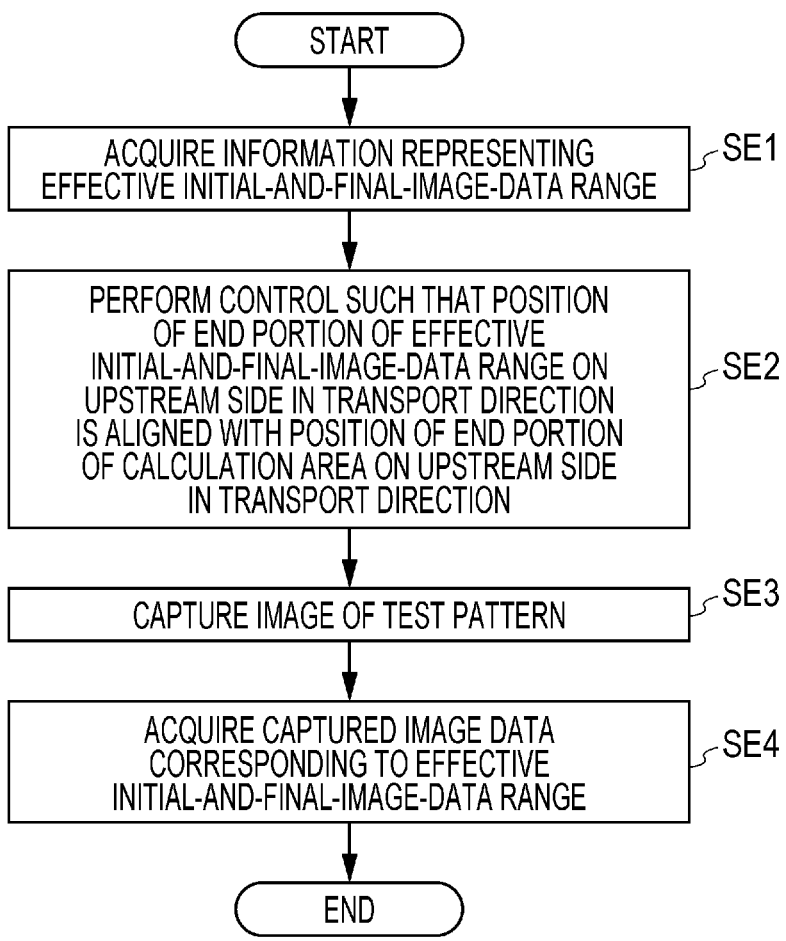
FIG. 17 is a flowchart illustrating an operation of the printing apparatus in final capturing processing.

FIG. 17 is a flowchart illustrating an operation of the printing apparatus 1 in final capturing processing.

The controller 100 of the printing apparatus 1 acquires information representing the effective initial-and-final-image-data range SYA corresponding to the test pattern 50 to be captured (step SE1).

Next, the controller 100 controls the carriage drive motor and the transport roller based on the information representing the effective initial-and-final-image-data range SYA acquired in step SE1 such that the position of the end portion of the effective initial-and-final-image-data range SYA on the upstream side in the transport direction HY1 is aligned with the position of the end portion of the calculation area SSA on the upstream side in the transport direction HY1 (step SE2).

Figure 18A:
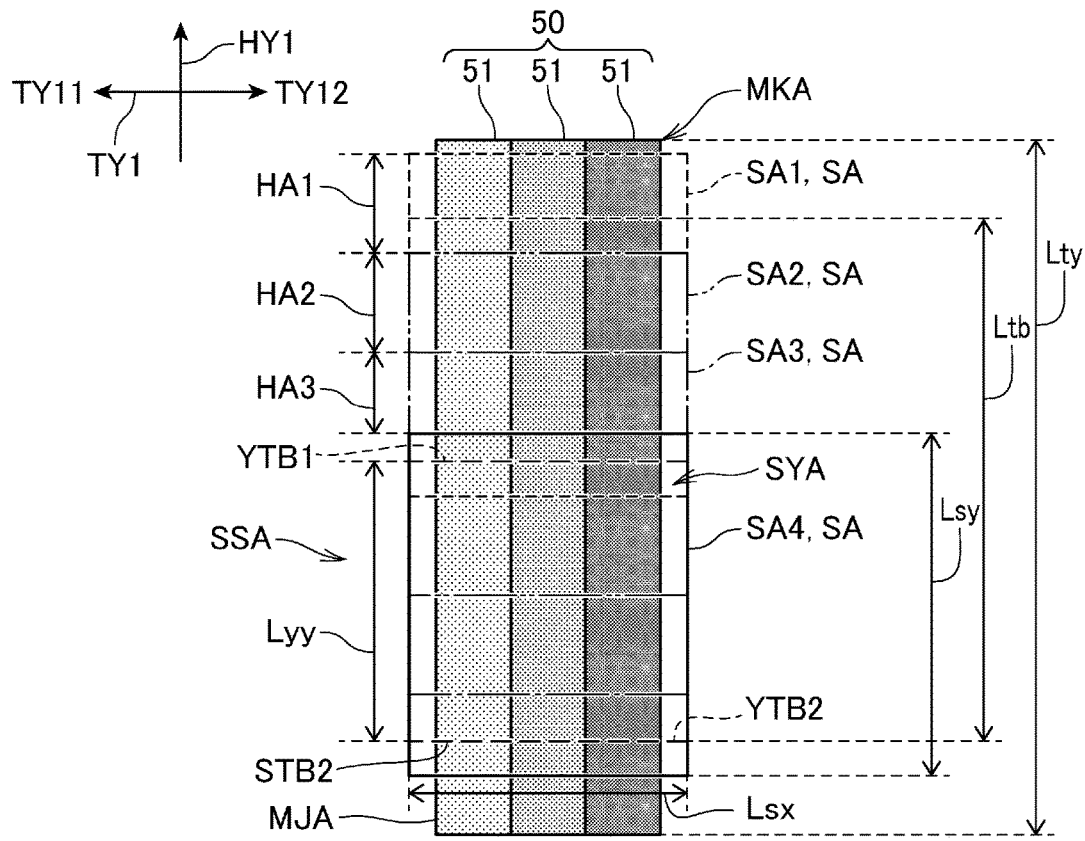
FIG. 18A is a diagram for explaining a position of an effective initial-and-final-image-data range.

FIG. 18A is a diagram for explaining a position of the effective initial-and-final-image-data range SYA in final capturing processing. FIG. 18A illustrates a position of the effective initial-and-final-image-data range SYA in a case where the initial capturing processing is executed, the continuous capturing processing is executed twice, and then the final capturing processing is executed.

As in the effective initial-and-final-image-data range SYA illustrated in FIG. 13A, the effective initial-and-final-image-data range SYA illustrated in FIG. 18A is a rectangular area in which a length in the transport direction HY1 has a dimension Lyy and a length in the perpendicular direction TY1 has a dimension Lsx.

As illustrated in FIG. 18A, the controller 100 transports the print medium 3 in the transport direction HY1 by the transport range HA3 such that a position of an end portion STB2 of the calculation area SSA of the test pattern 50 to be captured is aligned with a position of an end portion YTB2 of the effective initial-and-final-image-data range SYA of the capturing area SA. The end portion STB2 is an end portion of the calculation area SSA on the upstream side in the transport direction HY1. The end portion YTB2 is an end portion of the effective initial-and-final-image-data range SYA on the upstream side in the transport direction HY1. In addition, the transport range HA3 is not a transport range specified in the initial capturing processing or the continuous capturing processing, and is a transport range specified in processing performed immediately before the final capturing processing.

The controller 100 performs a control such that the position of the end portion STB2 is aligned with the position of the end portion YTB2, based on the position at which the test pattern 50 to be captured is printed on the print surface 3a, the dimension Lty representing the length of the test pattern 50 in the transport direction HY1, the dimension Ltb representing the length of the calculation area SSA in the transport direction HY1, the dimension Lsy representing the length of the capturing area SA in the transport direction HY1, and the dimension Lyy representing the length of the effective initial-and-final-image-data range SYA in the transport direction HY1.

As described above, in a case where the position of the end portion YTB2 of the effective initial-and-final-imagedata range SYA is aligned with the position of the end portion STB2 of the calculation area SSA, a length of the margin area MJA is set such that the area of the capturing area SA in the transport direction HY1 is filled with the test pattern 50. Therefore, as illustrated in FIG. 18A, even in a case where the position of the end portion YTB2 and the position of the end portion STB2 are aligned with each other, the area of the capturing area SA in the transport direction HY1 is filled with the test pattern 50.

Returning to the explanation of the flowchart illustrated in FIG. 17, the controller 100 causes the camera 72 to capture an image of the test pattern 50 when the position of the end portion of the effective initial-and-final-image-data range on the upstream side in the transport direction HY1 is aligned with the position of the end portion of the calculation area SSA on the upstream side in the transport direction HY1 (step SE3).

Next, the controller 100 acquires captured image data corresponding to the effective initial-and-final-image-data range, from captured image data representing the captured image of the test pattern 50 (step SE4). In a case of FIG. 18A, the controller 100 acquires captured image data of a region from the position of the end portion STB2 of the calculation area SSA to a position away from the position of the end portion STB2 by the dimension Lyy on the upstream side in the transport direction HY1, as captured image data corresponding to the effective initial-and-final-image-data range.

In this manner, in the final capturing of the test pattern 50, the controller 100 performs a control such that the position of the end portion STB2 of the calculation area SSA is aligned with the position of the end portion YTB2 of the effective initial-and-final-image-data range SYA. The controller 100 acquires the captured image data corresponding to the effective initial-and-final-image-data range SYA among the captured image data representing the captured image of the capturing area SA. As described above, the effective initial-and-final-image-data range SYA is a range in which the reflectance of the captured image data is within the effective reflectance range. Therefore, when calculating the density unevenness correction value, the controller 100 can acquire the captured image data by which an appropriate correction value for a portion around the end portion STB2 of the calculation area SSA can be calculated regardless of brightness unevenness. That is, the controller 100 can acquire the captured image data by which brightness unevenness in the portion around the end portion STB2 of the calculation area SSA can be reduced, the brightness unevenness being caused by the type of the print medium 3, the type of the ink ejected on the print medium 3, or the like.

Figure 18B:
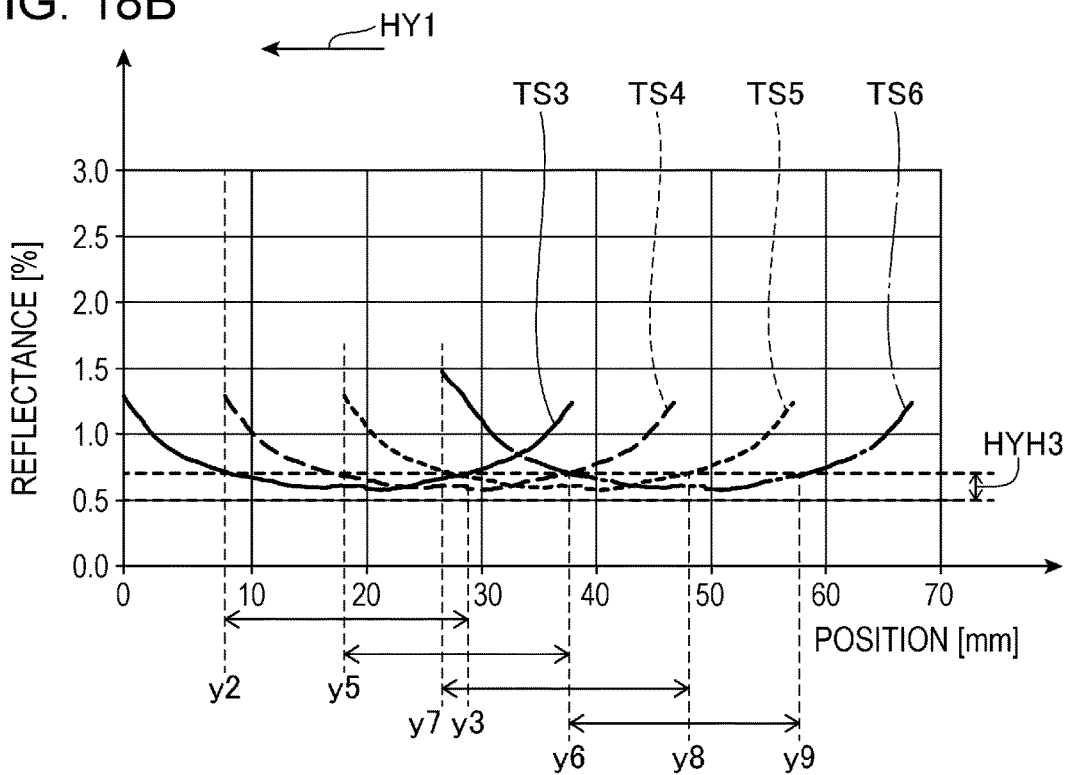
FIG. 18B is a graph illustrating an example of a reflectance characteristic in each band-shaped area.

FIG. 18B is a graph illustrating an example of a reflectance characteristic in the band-shaped area 51.

In FIG. 18B, a vertical axis represents reflectance of the irradiation light, the reflectance being expressed as a percentage of the average gradation value with respect to a white gradation value. In addition, in FIG. 18B, a horizontal axis represents a position of the band-shaped area 51 in the transport direction HY1, and a unit of the horizontal axis is millimeter (mm). In FIG. 18B, a position of a pixel positioned on the most upstream side of the calculation area SSA of the band-shaped area 51 in the transport direction HY1 is set as the origin of the horizontal axis. In FIG. 18B, in the horizontal axis, a direction toward the origin is the transport direction HY1.

A characteristic TS3 illustrated in FIG. 18B is the same as the characteristic TS3 illustrated in FIG. 13B, FIG. 15B, and FIG. 16B, and is a reflectance characteristic of the band-shaped area 51 having a density of 90% in the capturing area SA1. A characteristic TS4 illustrated in FIG. 18B is a reflectance characteristic of the band-shaped area 51 having a density of 90% in the capturing area SA2 illustrated in FIG. 18A. In addition, a characteristic TS5 illustrated in FIG. 18B is a reflectance characteristic of the band-shaped area 51 having a density of 90% in the capturing area SA3 illustrated in FIG. 18A. In addition, a characteristic TS6 illustrated in FIG. 18B is a reflectance characteristic of the band-shaped area 51 having a density of 90% in the capturing area SA4 illustrated in FIG. 18A.

As illustrated in FIG. 18B, similarly to the characteristic TS3, the characteristic TS4, and characteristic TS5, the characteristic TS6 is a U-shaped reflectance characteristic in which the reflectance decreases as the position is closer to the center of the capturing area in the transport direction HY1.

In FIG. 18B, a range from the origin to a position y2 in the horizontal axis corresponds to a transport range HA1 illustrated in FIG. 18A. In addition, in FIG. 18B, a range from the position y2 in the horizontal axis to a position y5 in the horizontal axis corresponds to a transport range HA2 illustrated in FIG. 18A. In addition, in FIG. 18B, a range from the position y5 in the horizontal axis to a position y7 in the horizontal axis corresponds to a transport range HA3 illustrated in FIG. 18A.

In addition, as illustrated in FIG. 18B, the characteristic TS6 is a reflectance characteristic in which the reflectance is outside the effective reflectance range HYH3 from a position y9 in the horizontal axis. This is because the capturing area SA4 is positioned such that the end portion STB2 of the calculation area SSA is aligned with the end portion YTB2 of the effective initial-and-final-image-data range SYA in a case where the print medium 3 is transported in the transport direction HY1 by the transport range HA3.

Returning to the explanation of the flowchart illustrated in FIG. 8, when the final capturing processing is executed, the controller 100 acquires synthesized captured-image data obtained by synthesizing the captured image data representing the captured image captured in the initial capturing processing and the captured image data representing the captured image captured in the final capturing processing, or by synthesizing the captured image data representing the captured image captured in the initial capturing processing, the captured image data representing the captured image captured in the continuous capturing processing, and the captured image data representing the captured image captured in the final capturing processing (step SB15).

Here, step SB15 will be described.

Figure 19:
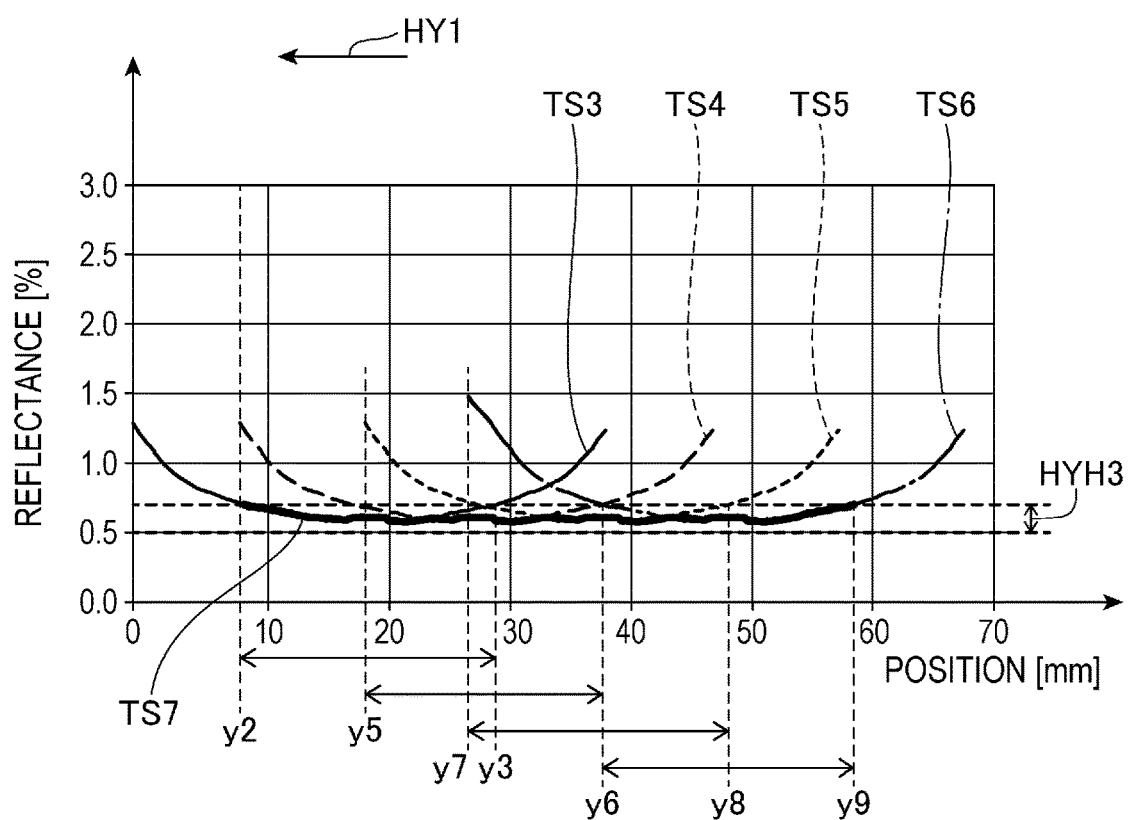
FIG. 19 is a graph for explaining acquisition of synthesized captured-image data.

FIG. 19 is a graph for explaining acquisition of synthesized captured-image data.

In FIG. 19, a vertical axis represents reflectance of the irradiation light, the reflectance being expressed as a percentage of the average gradation value with respect to a white gradation value. In addition, in FIG. 19, a horizontal axis represents a position of the band-shaped area 51 in the transport direction HY1, and a unit of the horizontal axis is millimeter (mm). In FIG. 19, a position of a pixel positioned on the most upstream side of the calculation area SSA of the band-shaped area 51 in the transport direction HY1 is set as the origin of the horizontal axis. In FIG. 19, in the horizontal axis, a direction toward the origin is the transport direction HY1.

Each of characteristics TS3, TS4, TS5, and TS6 illustrated in FIG. 19 is the same as each of the characteristics TS3, TS4, TS5, and TS6 illustrated in FIG. 18B. As illustrated in FIG. 19, each of the characteristics TS3, TS4, TS5, and TS6 is a U-shaped reflectance characteristic in which the reflectance decreases as the position is closer to the center of the capturing area in the transport direction HY1.

In FIG. 19, a region from a position y2 in the horizontal axis to a position y3 in the horizontal axis represents a region represented by the captured image data in the transport direction HY1 that is acquired in the initial capturing processing. That is, the region from the position y2 in the horizontal axis to the position y3 in the horizontal axis corresponds to the effective initial-and-final-image-data range in the initial capturing processing. In addition, in FIG. 19, a region from a position y5 in the horizontal axis to a position y6 in the horizontal axis represents a region represented by the captured image data in the transport direction HY1 that is acquired in the continuous capturing processing immediately after the initial capturing processing. That is, the region from the position y5 in the horizontal axis to the position y6 in the horizontal axis corresponds to the effective acquisition range in the continuous capturing processing immediately after the initial capturing processing. In addition, in FIG. 19, a region from a position y7 in the horizontal axis to a position y8 in the horizontal axis represents a region represented by the captured image data in the transport direction HY1 that is acquired in the second continuous capturing processing. That is, the region from the position y7 in the horizontal axis to the position y8 in the horizontal axis corresponds to the effective acquisition range in the second continuous capturing processing. In addition, in FIG. 19, a region from the position y6 in the horizontal axis to a position y9 in the horizontal axis represents a region represented by the captured image data in the transport direction HY1 that is acquired in the final capturing processing. That is, the region from the position y6 in the horizontal axis to the position y9 in the horizontal axis corresponds to the effective initial-and-final-image-data range in the final capturing processing.

When acquiring the synthesized captured-image data by synthesizing pieces of captured image data in step SB15, among regions of the pieces of captured image data in the transport direction HY1, for each region at which the pieces of captured image data overlap with each other, the controller 100 acquires the synthesized captured-image data by adopting a gradation value of the captured image data having a lower reflectance.

In a case of FIG. 19, for a region at which the region from the position y2 in the horizontal axis to the position y3 in the horizontal axis and the region from the position y5 in the horizontal axis to the position y6 in the horizontal axis overlap with each other, the controller 100 acquires the synthesized captured-image data by adopting a gradation value of the captured image data having a lower reflectance. Similarly, in the case of FIG. 19, for a region at which the region from the position y5 in the horizontal axis to the position y6 in the horizontal axis and the region from the position y7 in the horizontal axis to the position y8 in the horizontal axis overlap with each other, the controller 100 acquires the synthesized captured-image data by adopting a gradation value of the captured image data having a lower reflectance. Similarly, in the case of FIG. 19, for a region at which the region from the position y7 in the horizontal axis to the position y8 in the horizontal axis and the region from the position y6 in the horizontal axis to the position y9 in the horizontal axis overlap with each other, the controller 100 acquires the synthesized captured-image data by adopting a gradation value of the captured image data having a lower reflectance. Thereby, as illustrated by a characteristic TS7 (a characteristic represented by a thick line) illustrated in FIG. 19, the controller 100 can acquire the synthesized captured-image data in which the reflectance is within the effective reflectance range HYH3. That is, the controller 100 can acquire the captured image data of the test pattern 50 in which brightness unevenness is reduced. Therefore, by acquiring the synthesized captured-image data, the controller 100 can acquire the captured image data of the test pattern 50 with appropriate image quality, regardless of a type of the print medium 3 or a type of the ink ejected onto the print medium 3, or the like.

Particularly, for the region at which the pieces of captured image data overlap with each other, the controller 100 acquires the synthesized captured-image data by adopting the gradation value of the captured image data having a lower reflectance. Thereby, the synthesized captured-image data in which brightness unevenness is reduced in the effective reflectance range HYH3 can be acquired, and thus the controller 100 can acquire the captured image data of the test pattern 50 with appropriate image quality and more accuracy.

In addition, in FIG. 19, the position y2 in the horizontal axis represents the position of the end portion of the calculation area SSA on the downstream side in the transport direction HY1, and the position y8 in the horizontal axis represents the position of the end portion of the calculation area SSA on the upstream side in the transport direction HY1. That is, the characteristic TS7 represents the reflectance of the synthesized captured-image data, and represents the reflectance of the entire area of the calculation area SSA in the transport direction HY1. As described above, the controller 100 causes the camera 72 to capture an image of the test pattern 50, executes acquisition processing of the captured image data corresponding to the effective initial-and-final-image-data range or the effective acquisition range by a predetermined number of times, and acquires the synthesized captured-image data obtained by synthesizing the pieces of captured image data acquired by executing the acquisition processing by a predetermined number of times. Thereby, the controller 100 can acquire the captured image data of the test pattern 50 with appropriate image quality according to the length of the calculation area SSA of the test pattern 50 in the transport direction HY1.

In addition, as described above, the effective initial-and-final-image-data range SYA and the effective acquisition range are ranges each in which the reflectance represented by the reflectance characteristic is within the effective reflectance range and which are maximum ranges in the transport direction HY1. Thereby, the controller 100 can acquire the captured image data of the test pattern 50 with appropriate image quality by a required minimum number of times. Therefore, the number of times of capturing by the camera 72 can be reduced, and a processing speed for acquiring the captured image data of the test pattern 50 can be increased.

Returning to the explanation of the flowchart illustrated in FIG. 8, when acquiring the synthesized captured-image data based on one test pattern 50, the controller 100 determines whether or not the synthesized captured-image data is acquired for all of the test patterns 50 printed in step SB9 (step SB16). In a case where it is determined that the synthesized captured-image data is not acquired for all of the test patterns 50 (NO in step SB16), the controller 100 returns to the processing of step SB10, and acquires the synthesized captured-image data for the test pattern 50 which is not captured. On the other hand, in a case where it is determined that the synthesized captured-image data is acquired for all of the test patterns 50 (YES in step SB16), the controller 100 executes correction value acquisition processing based on the synthesized captured-image data acquired from the one test pattern 50 (step SB17).

Figure 20:
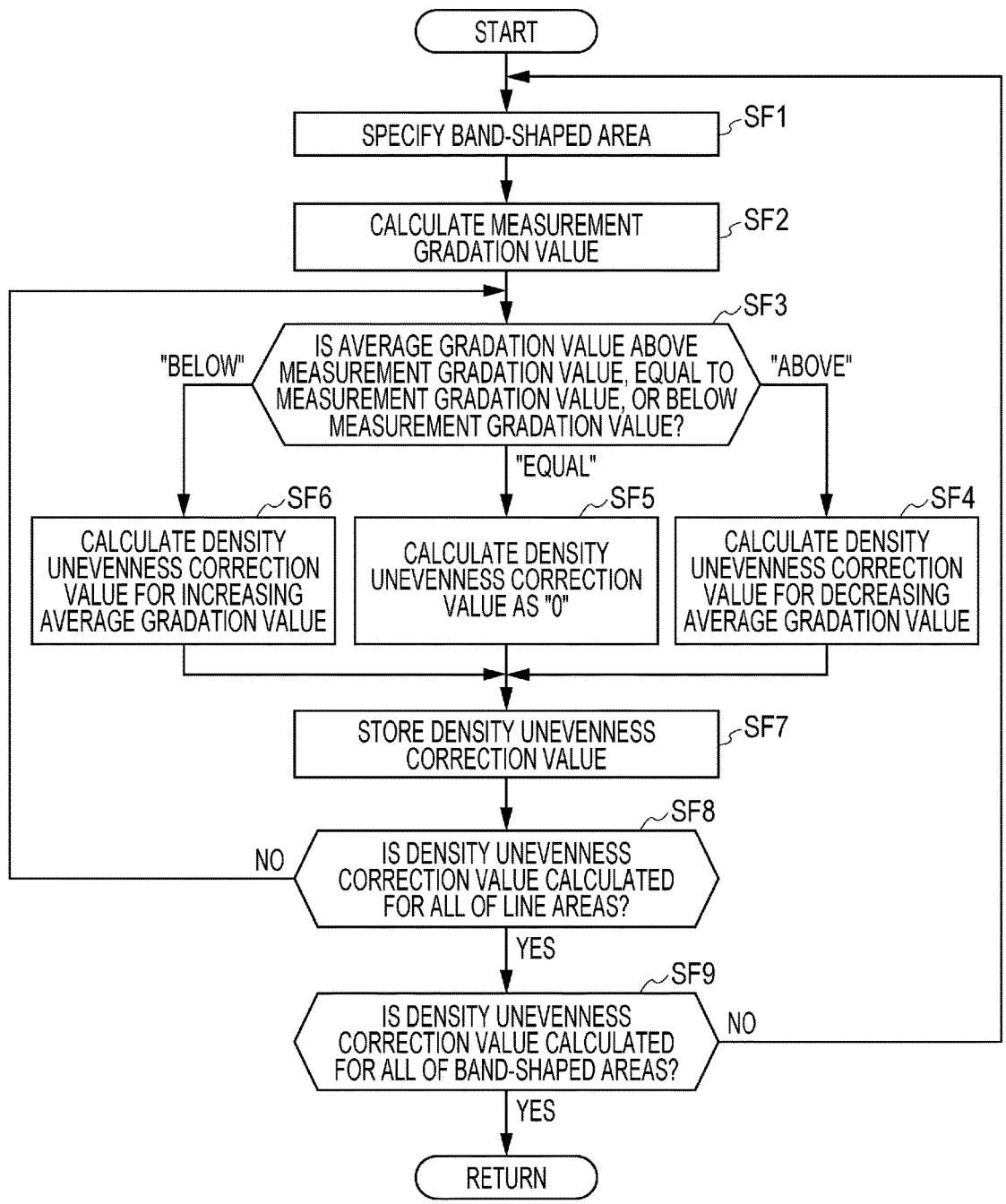
FIG. 20 is a flowchart illustrating an operation of the printing apparatus in correction value acquisition processing.

FIG. 20 is a flowchart illustrating an operation of the printing apparatus 1 in correction value acquisition processing.

The controller 100 determines (specifies) the band-shaped area 51 for calculating a density unevenness correction value, among the band-shaped areas 51 of the test pattern 50, based on the synthesized captured-image data (step SF1).

Next, the controller 100 calculates an average gradation value by averaging gradation values for each line area of the specified band-shaped area 51, averages the calculated average gradation value for each line area, and calculates a measurement gradation value of the specified band-shaped area 51 by the averaging of the average gradation value (step SF2). The measurement gradation value is a gradation value which is used as a reference when calculating a density unevenness correction value for each line area.

Next, when calculating the measurement gradation value, the controller 100 determines, for one line area, whether the average gradation value of the line area is above the measurement gradation value, is equal to the measurement gradation value, or is below the measurement gradation value (step SF3).

In step SF3, in a case where it is determined that the average gradation value is above the measurement gradation value ("above" in step SF3), the controller 100 calculates a density unevenness correction value for decreasing the average gradation value such that the average gradation value of the line area as a target in step SF3 approaches the measurement gradation value (step SF4). That is, the controller 100 calculates a density unevenness correction value for decreasing the dot generation rate of the line area such that the average gradation value of the line area as a target approaches the measurement gradation value. As a specific calculation method of the density unevenness correction value, any existing method can be adopted as long as the density unevenness correction value for decreasing the dot generation rate of the line area can be calculated by the method.

In step SF3, in a case where it is determined that the average gradation value is equal to the measurement gradation value ("equal" in step SF3), the controller 100 calculates a density unevenness correction value of the line area as a target in step SF3, as "0" (step SF5).

In step SF3, in a case where it is determined that the average gradation value is below the measurement gradation value ("below" in step SF3), the controller 100 calculates a density unevenness correction value for increasing the average gradation value such that the average gradation value of the line area as a target in step SF3 approaches the measurement gradation value (step SF6). That is, the controller 100 calculates a density unevenness correction value for increasing the dot generation rate of the line area such that the average gradation value of the line area as a target approaches the measurement gradation value. As a specific calculation method of the density unevenness correction value, any existing method can be adopted as long as the density unevenness correction value for increasing the dot generation rate of the line area can be calculated by the method.

In this manner, the controller 100 detects density unevenness based on the synthesized captured-image data by determining, for one line area, whether the average gradation value is above the measurement gradation value, is equal to the measurement gradation value, or is below the measurement gradation value. As described above, the synthesized captured-image data is captured image data of the test pattern 50 in which brightness unevenness is reduced. Therefore, the controller 100 detects density unevenness based on the captured image data of the test pattern 50 that can be acquired with appropriate image quality, regardless of a type of the print medium 3, a type of the ink ejected onto the print medium 3, or the like. Thus, density unevenness can be detected with high accuracy.

In addition, the controller 100 calculates the density unevenness correction value based on the synthesized captured-image data. Therefore, an influence by brightness unevenness caused by the type of the print medium 3, the type of the ejected ink, or the like can be suppressed. Thus, the controller 100 can calculate the density unevenness correction value with high accuracy. That is, the controller 100 adjusts an amount of the ink to be ejected for each line area, that is, the dot generation rate, based on the density unevenness correction value which is calculated with high accuracy. Thus, density unevenness can be suppressed with high accuracy.

When calculating the density unevenness correction value, the controller 100 stores the calculated density unevenness correction value in the storage 101 in correlation with information representing the line area as a target (step SF7).

Next, when storing the calculated density unevenness correction value in the storage 101 in correlation with the information representing the line area as a target, the controller 100 determines whether or not the density unevenness correction value is calculated for all of the line areas of the band-shaped area 51 specified in step SF1 (step SF8).

Next, in a case where it is determined that the density unevenness correction value is not calculated for all of the line areas of the specified band-shaped area 51 (NO in step SF8), the controller 100 returns to the processing of step SF3, and calculates a density unevenness correction value for the line area as a target for which a density unevenness correction value is not calculated. On the other hand, in a case where it is determined that the density unevenness correction value is calculated for all of the line areas of the specified band-shaped area 51 (YES in step SF8), the controller 100 determines whether or not the density unevenness correction value is calculated for all of the band-shaped areas 51 of the test pattern 50 (step SF9).

In a case where it is determined that the density unevenness correction value is not calculated for all of the band-shaped areas 51 of the test pattern 50 (NO in step SF9), the controller 100 returns to the processing of step SF1, and specifies the band-shaped area 51 for which the density unevenness correction value is not calculated. On the other hand, in a case where it is determined that the density unevenness correction value is calculated for all of the band-shaped areas 51 of the test pattern 50 (YES in step SF9), the controller 100 ends the correction value calculation processing.

Returning to the explanation of the flowchart illustrated in FIG. 8, when executing correction value acquisition processing, the controller 100 determines whether or not the correction value acquisition processing is executed for all of the test patterns 50 printed on the print surface 3*a* of the print medium 3 (step SB18). In a case where it is determined that the correction value acquisition processing is not executed for all of the test patterns 50 (NO in step SB18), the controller 100 returns to the processing of step SB17, and executes the correction value acquisition processing for the test pattern 50 for which the correction value acquisition processing is not executed. On the other hand, in a case where it is determined that the correction value acquisition processing is executed for all of the test patterns 50 (YES in step SB18), the controller 100 ends the correction value acquisition processing.

As described above, the printing apparatus 1 includes the transport mechanism 106 that transports the print medium 3 in the transport direction HY1, the ink jet head 8 (print head) that executes printing on the print medium 3, the camera 72 that captures an image of the print medium 3, the LED light source 73a (light source) and the LED light source 73b (light source) that irradiate the capturing area SA of the camera 72 with light at a predetermined angle with respect to the print surface 3a of the print medium 3, the carriage 6 that includes the ink jet head 8, the camera 72, and the LED light source 73a and the LED light source 73b, and the controller 100. Based on the captured image obtained by capturing an image of the test pattern 50 by the camera 72, the test pattern 50 being printed on the print medium 3 by the ink jet head 8, the controller 100 acquires reflectance characteristic data representing a reflectance characteristic of the irradiation light from the LED light source 73a and the LED light source 73b, determines (specifies) an effective initial-and-final-image-data range SYA (a specific initial-and-final-image-data range, a specific range, an effective range) representing a range in the transport direction HY1 (a range in a direction corresponding to the transport direction HY1) in which the reflectance is within an effective reflectance range (a specific reflectance range, a predetermined range) or an effective acquisition range (a specific acquisition range, a specific range, an effective range) based on the acquired reflectance characteristic data, and acquires captured image data representing the captured image corresponding to the effective initial-and-final-image-data range SYA or the effective acquisition range.

In this configuration, the controller 100 acquires the effective initial-and-final-image-data range SYA in which the reflectance of the irradiation light from the LED light source 73a and the LED light source 73b is within the effective reflectance range or the captured image data corresponding to the effective acquisition range. Therefore, the controller 100 can acquire the captured image data of the test pattern 50 with appropriate image quality, regardless of factors that can be influenced by light irradiation, that is, a type of the print medium 3, a type of the ink to be ejected, and the like.

In addition, the controller 100 determines (specifies) a transport range for transporting the print medium 3 in the transport direction HY1 based on the specified effective initial-and-final-image-data range SYA or the effective acquisition range, causes the transport mechanism 106 to transport the print medium 3 in the transport direction HY1 by the specified transport range, causes the camera 72 to capture an image of the test pattern 50, determines (specifies) the effective acquisition range based on the captured image, executes acquisition processing of the captured image data corresponding to the effective acquisition range by a predetermined number of times, and acquires synthesized captured-image data by synthesizing pieces of captured image data acquired by executing the acquisition processing by a predetermined number of times.

In this configuration, the controller 100 acquires the synthesized captured-image data by synthesizing pieces of captured image data acquired by executing the acquisition processing by a predetermined number of times. Therefore, the controller 100 can acquire the captured image data of the test pattern 50 with appropriate image quality according to the length of the test pattern 50.

In addition, the controller 100 determines (specifies) a range in which the reflectance is within the effective reflectance range and which is a maximum range in the transport direction HY1 (a maximum range in a direction corresponding to the transport direction HY1), as the effective initial-and-final-image-data range SYA or the effective acquisition range.

In this configuration, the controller 100 specifies the range in which the reflectance of the light is within the effective reflectance range and which is a maximum range in the transport direction HY1, as the effective initial-and-final-image-data range SYA or the effective acquisition range. Therefore, the number of times of capturing by the camera 72 can be reduced, and a processing speed for acquiring the captured image data of the test pattern 50 can be increased.

In addition, the controller 100 detects density unevenness based on the synthesized captured-image data acquired by synthesizing the pieces of captured image data.

As described above, the synthesized captured-image data is captured image data of the test pattern 50 in which brightness unevenness is reduced. Therefore, the controller 100 detects density unevenness based on the captured image data of the test pattern 50 that can be acquired with appropriate image quality, regardless of a type of the print medium 3, a type of the ink ejected onto the print medium 3, or the like. Thus, density unevenness can be detected with high accuracy.

In addition, the ink jet head 8 includes the nozzles 81 for ejecting an ink. The controller 100 adjusts an amount of the ink to be ejected from the nozzle 81 based on the detected density unevenness.

As described above, the controller 100 calculates the density unevenness correction value based on the synthesized captured-image data. Therefore, an influence by brightness unevenness caused by the type of the print medium 3, the type of the ejected ink, or the like can be suppressed. Thus, the controller 100 can calculate the density unevenness correction value with high accuracy. That is, the controller 100 adjusts an amount of the ink to be ejected for each line area, that is, the dot generation rate, based on the density unevenness correction value which is calculated with high accuracy. Thus, density unevenness can be suppressed with high accuracy.

The above-described embodiments have been presented by way of example only, and can be freely modified and applied within the scope of the invention.

For example, in the above-described embodiments, as an example of a sequence of the operation of the printing apparatus 1, a sequence of printing all of the test patterns 50 and then acquiring the synthesized captured-image data for all of the test patterns 50 is exemplified. On the other hand, the sequence of the operation of the printing apparatus 1 is not limited thereto, and may be a sequence of printing one test pattern 50 and then acquiring the synthesized captured-image data based on the one test pattern 50. In addition, as a sequence of the operation of the printing apparatus 1, a sequence of acquiring the synthesized captured-image data for all of the test patterns 50 and then executing the correction value acquisition processing is exemplified. On the other hand, the sequence of the operation of the printing apparatus 1 is not limited thereto, and may be a sequence of acquiring the synthesized captured-image data for one test pattern 50 and then executing the correction value acquisition processing for all of the test patterns 50.

In addition, for example, in a case where a control method of the printing apparatus 1 is realized by using a computer included in the printing apparatus 1, the invention may be configured in a form of a program to be executed by a computer to realize the control method, and a computer-readable recording medium in which the program is recorded to be readable by the computer or a transmission medium for transmitting the program. As the recording medium, a magnetic recording medium, an optical recording medium, or a semiconductor memory device may be used. More specifically, a flexible disk, a hard disk drive (HDD), a compact disk read only memory (CD-ROM), a digital versatile disk (DVD), a Blu-ray (registered trademark) disc, a magneto-optical disk, a flash memory, a portable type recording medium such as a card type recording medium, or a fixed type recording medium may be used. In addition, the recording medium may be a non-volatile memory device such as a read only memory (ROM) or an HDD which is an internal memory device of the printing apparatus 1.

In addition, for easy understanding of the invention, functional blocks described with reference to FIG. 4 are schematically illustrated by classifying a functional configuration of each device according to main processing contents. The configuration of each device may be classified into more components according to the processing contents. In addition, the configuration of each device may be classified such that one component performs more processing. In addition, processing in each component may be executed by one piece of hardware, or may be executed by a plurality of pieces of hardware. In addition, processing in each component may be realized by one program, or may be realized by a plurality of programs.

In the flowcharts illustrated in FIGS. 8, 12, 14, 17, and 20, for easy understanding of the processing in the printing apparatus 1, processing units are divided according to the main processing contents. The invention is not limited by a division manner and a division name of the processing units. The processing of the printing apparatus 1 may be divided into more processing units according to the processing contents. The processing of the printing apparatus 1 may be divided such that one processing unit includes more processing. In addition, as long as the same processing can be performed, an order of processing in the flowchart is not limited to the example illustrated in the drawings.

What is claimed is:

1. A printing apparatus comprising:
    a transport mechanism configured to transport a print medium in a transport direction;
    a print head configured to print on the print medium;
    a camera configured to capture an image of the print medium;
    a light source configured to irradiate a capturing area of the camera with light at a predetermined angle with respect to a print surface of the print medium;
    a carriage configured to mount the print head, the camera, and the light source; and
    a processor configured to
        acquire reflectance characteristic data representing a reflectance characteristic of irradiation light from the light source based on a captured image obtained by capturing an image of a test pattern by the camera, the test pattern being printed on the print medium by the print head,
        determine a specific range of positions on the captured image, in a direction corresponding to the transport direction, in which a reflectance of the irradiation light is within a predetermined reflectance range based on the acquired reflectance characteristic data, and
        acquire captured image data representing the captured image corresponding to the specific range of positions.

2. The printing apparatus according to claim 1,
wherein the processor configured to determine a transport range for transporting the print medium in the transport direction based on the specific range, cause the transport mechanism to transport the print medium in the transport direction by the determined transport range, cause the camera to capture an image of the test pattern, determine the specific range based on the captured image, execute acquisition processing of the captured image data corresponding to the specific range by a predetermined number of times, and acquire synthesized captured-image data by synthesizing pieces of the captured image data acquired by executing the acquisition processing by the predetermined number of times.

3. The printing apparatus according to claim 2,
wherein the processor configured to detect density unevenness based on the synthesized captured-image data which is acquired.

4. The printing apparatus according to claim 3,
wherein the print head configured to include a nozzle for ejecting an ink, and
wherein the processor configured to adjust an amount of the ink to be ejected from the nozzle based on the detected density unevenness.

5. The printing apparatus according to claim 1,
wherein the processor configured to determine a range in which the reflectance is within a predetermined range and which is a maximum range in a direction corresponding to the transport direction, as the specific range.

6. A control method of a printing apparatus configured to include a transport mechanism which transports a print medium in a transport direction and a carriage, the carriage mounting a print head which prints on the print medium, a camera which captures an image of the print medium, and a light source which irradiates a capturing area of the camera with light at a predetermined angle with respect to a print surface of the print medium, the method comprising:
    acquiring reflectance characteristic data representing a reflectance characteristic of irradiation light from the light source based on a captured image obtained by capturing an image of a test pattern by the camera, the test pattern being printed on the print medium by the print head;
    determining a specific range of positions on the captured image in a direction corresponding to the transport direction in which a reflectance of the irradiation light is within a predetermined reflectance range based on the acquired reflectance characteristic data; and
    acquiring captured image data representing the captured image corresponding to the specific range of positions.

7. The control method of a printing apparatus according to claim 6, further comprising:
    determining a transport range for transporting the print medium in the transport direction based on the specific range;
    causing the transport mechanism to transport the print medium in the transport direction by the determined transport range;
    causing the camera to capture an image of the test pattern;

determining the specific range based on the captured image;

executing acquisition processing of the captured image data corresponding to the specific range by a predetermined number of times; and acquiring synthesized captured-image data by synthesizing pieces of the captured image data acquired by executing the acquisition processing by the predetermined number of times.

8. The control method of a printing apparatus according to claim 7, further comprising:

detecting density unevenness based on the synthesized captured-image data which is acquired.

9. The control method of a printing apparatus according to claim 8, wherein the print head includes a nozzle for ejecting an ink, and wherein an amount of the ink to be ejected from the nozzle is adjusted based on the detected density unevenness.

10. The control method of a printing apparatus according to claim 6, wherein a range in which the reflectance is within a predetermined range and which is a maximum range in a direction corresponding to the transport direction is determined as the specific range.

* * * * *